United States Patent
Demko et al.

(10) Patent No.: US 6,697,532 B1
(45) Date of Patent: Feb. 24, 2004

(54) SYSTEM AND METHOD FOR PRODUCING DESCRIPTORS FOR IMAGE COMPRESSION

(75) Inventors: Stephen George Demko, Atlanta, GA (US); Keshi Chen, Duluth, GA (US); Mehdi Khosravi, Roswell, GA (US)

(73) Assignee: Iterated Systems, Inc., Atlanta, GA (US)

( * ) Notice: Subject to any disclaimer, the term of this patent is extended or adjusted under 35 U.S.C. 154(b) by 0 days.

(21) Appl. No.: 09/430,204

(22) Filed: Oct. 29, 1999

Related U.S. Application Data

(60) Provisional application No. 60/106,400, filed on Oct. 30, 1998.

(51) Int. Cl.$^7$ .............................. G06K 9/36; G06K 9/46
(52) U.S. Cl. ..................................................... 382/249
(58) Field of Search ................................ 382/168, 170, 382/224, 249, 286, 238

(56) References Cited

U.S. PATENT DOCUMENTS

| | | | | |
|---|---|---|---|---|
| 5,497,435 A | * | 3/1996 | Berger | 375/240.1 |
| 6,016,487 A | * | 1/2000 | Rioux et al. | 707/2 |
| 6,163,628 A | * | 12/2000 | Ibenthal et al. | 382/240 |

OTHER PUBLICATIONS

"Image Descriptors Based on Fractal Transform Analysis" by Stephen Demko, Mehdi Khosravi and Keshi Chen *Storage and Retrieval for Image and Video*, vol. 3656, pp. 379–389, SPIE Jan., 1999.

"The QBIC Project: Querying Images by Content Using Color, Texture and Shape" by W. Niblack, R. Barber, W. Equitz, M. Flickner, E. Glasman, D. Petkovic, and P. Yanker *Storage and Retireval for Image and Video Databases*, vol. 1908, pp. 173–187, SPIE Feb., 1993.

(List continued on next page.)

*Primary Examiner*—Phuoc Tran
(74) *Attorney, Agent, or Firm*—Glenn Patent Group; Michael A. Glenn

(57) ABSTRACT

The methods of the invention can be used with image data divided into domain blocks. A predetermined search pattern of range blocks centered on a domain block is defined for use in the methods. The first method includes a step of generating at least one error descriptor data based on domain block data and range block data. The error descriptor data can be derived by scaling the range blocks to the pixel size of a domain block, and subtracting the means of the range blocks and domain block from each pixel thereof. The mean-adjusted, scaled pixel intensity levels of the scaled range blocks are subtracted from mean-adjusted pixel intensity levels of the domain block to produce difference data. The absolute value of the difference data is taken and the positive difference data are summed to produce summed error data for each range block. The summed error data is used to derive at least one error descriptor data for the image. The invention includes a method of using the error descriptor data of a source image to search a database of error descriptor data for target images to select target images relatively close to the source image. The invention also includes a related system.

19 Claims, 26 Drawing Sheets

OTHER PUBLICATIONS

"Automatic and Semiautomatic Methods for Image Annotation and Retrieval in QBIC" by J. Ashley, R. Barber, M. Flickner, J. Haffner, D. Lee, W. Niblack, and D. Petkovic *Storage and Retrieval for Image and Video Databases III*, vol. 2420, pp. 24–35, SPIE, Feb., 1995.

"Image Retrieval Using the Directional Detail Histogram" by D. Androutsos, K.N. Plataniotis, and A.N. Venetsanopoulos *Storage and Retrieval for Image and Video Databases VI*, vol. 3312, pp. 129–137, SPIE, Jan., 1998.

"Color Indexing" by M. Swain and D. Ballard *Intenational Journal of Computer Vision*, vol. 7, No. 1, 1991.

"Image Database Indexing and Retrieval Using Iterated Functions Systems" by J.M. Marie–Julie and H. Essafi *Technical Report*, LETI (CEA–Technologies Avancees) DEIN—CEA Saclay, Gif sur Yvette, France, 1997.

"Retrieving Database Contents by Image Recognition: New Fractal Power" by Alan D. Sloan *Advanced Imaging*, vol. 9, pp. 26–30, May, 1994.

* cited by examiner

FIGURE 4A $$\left|\begin{array}{cccc} -.5 & -.5 & -.5 & -1.5 \\ -.5 & .5 & -.5 & -1.5 \\ -.5 & .5 & .5 & 1.5 \\ -.5 & .5 & .5 & 1.5 \end{array}\right| - \left|\begin{array}{cccc} .625 & .375 & -1.125 & -1.125 \\ .625 & .375 & -.625 & -1.375 \\ 1.625 & .375 & 1.375 & 1.625 \\ 1.625 & -.125 & .375 & -.875 \end{array}\right| = \left|\begin{array}{cccc} -1.125 & .125 & .625 & -.375 \\ -1.25 & .125 & .125 & .125 \\ 1.125 & .125 & -.875 & -.125 \\ -2.125 & .625 & .125 & 2.375 \end{array}\right|$$

$$\sum \left|\begin{array}{cccc} 1.125 & .125 & .625 & .375 \\ 1.25 & .125 & .125 & .125 \\ 1.125 & .125 & .875 & .125 \\ 2.125 & .625 & .125 & 2.375 \end{array}\right| = 11.375$$

FIGURE 4B $$\left|\begin{array}{cccc} -.5 & -.5 & -.5 & -1.5 \\ -.5 & .5 & -.5 & -1.5 \\ -.5 & .5 & .5 & 1.5 \\ -.5 & .5 & .5 & 1.5 \end{array}\right| - \left|\begin{array}{cccc} -.125 & .031 & 1.031 & -1.969 \\ .781 & -.469 & .031 & -1.219 \\ 1.031 & -.219 & -.969 & .281 \\ 2.281 & .031 & -.469 & -1.469 \end{array}\right| = \left|\begin{array}{cccc} -.375 & .469 & -1.531 & -1.875 \\ -.875 & .125 & .375 & -1.125 \\ -2.875 & 1.125 & 1.125 & 1.875 \\ -1.875 & .375 & .625 & 2.125 \end{array}\right|$$

$$\sum \left|\begin{array}{cccc} .375 & .469 & 1.531 & 1.875 \\ .875 & .125 & .375 & 1.125 \\ 2.875 & 1.125 & 1.125 & 1.875 \\ 1.875 & .375 & .625 & 2.125 \end{array}\right| = 17.5$$

FIGURE 4C $$\left|\begin{array}{cccc} -.5 & -.5 & -.5 & -1.5 \\ -.5 & .5 & -.5 & -1.5 \\ -.5 & .5 & .5 & 1.5 \\ -.5 & .5 & .5 & 1.5 \end{array}\right| - \left|\begin{array}{cccc} 1.281 & .031 & 1.031 & -1.969 \\ .781 & -.469 & .031 & -1.219 \\ 1.031 & -.219 & -.969 & .281 \\ 2.281 & .031 & -.469 & -1.469 \end{array}\right| = \left|\begin{array}{cccc} -1.781 & .469 & -1.531 & .469 \\ -1.281 & .969 & -.531 & -.281 \\ -1.531 & .719 & 1.469 & 1.219 \\ -2.781 & .469 & .969 & 2.969 \end{array}\right|$$

$$\sum \left|\begin{array}{cccc} 1.781 & .469 & 1.531 & .469 \\ 1.281 & .969 & .531 & .281 \\ 1.531 & .719 & 1.469 & 1.219 \\ 2.781 & .469 & .969 & 2.969 \end{array}\right| = 19.438$$

FIGURE 4D $$\begin{vmatrix} -.5 & -.5 & -.5 & -1.5 \\ -.5 & .5 & -.5 & -1.5 \\ -.5 & .5 & .5 & 1.5 \\ -.5 & .5 & .5 & 1.5 \end{vmatrix} - \begin{vmatrix} -.406 & -.656 & .344 & .094 \\ -.156 & -.656 & .344 & .094 \\ .344 & -.656 & 1.344 & .094 \\ -.156 & -.406 & .844 & -.406 \end{vmatrix} = \begin{vmatrix} -.094 & 1.156 & -.844 & -1.594 \\ -.656 & 1.156 & -.844 & -1.594 \\ -.844 & 1.156 & -.844 & 1.406 \\ -.344 & .906 & -.344 & 1.906 \end{vmatrix}$$

$$\sum \begin{vmatrix} .094 & 1.156 & .844 & 1.594 \\ .656 & 1.156 & .844 & 1.594 \\ .844 & 1.156 & .844 & 1.406 \\ .344 & .906 & .344 & 1.906 \end{vmatrix} = 15.688$$

FIGURE 4E $$\begin{vmatrix} -.5 & -.5 & -.5 & -1.5 \\ -.5 & .5 & -.5 & -1.5 \\ -.5 & .5 & .5 & 1.5 \\ -.5 & .5 & .5 & 1.5 \end{vmatrix} - \begin{vmatrix} .828 & .578 & -.422 & -1.172 \\ 1.078 & .828 & -.422 & -.672 \\ .828 & .578 & .922 & .922 \\ .828 & .578 & -.422 & -1.172 \end{vmatrix} = \begin{vmatrix} -1.328 & -.078 & .922 & -.328 \\ -1.578 & -.328 & -1.422 & -.828 \\ -1.328 & -.078 & -.422 & .578 \\ -1.328 & -.078 & .922 & 2.672 \end{vmatrix}$$

$$\sum \begin{vmatrix} 1.328 & .078 & .922 & .328 \\ 1.578 & .328 & 1.422 & .828 \\ 1.328 & .078 & .422 & .578 \\ 1.328 & .078 & .922 & 2.672 \end{vmatrix} = 14.218$$

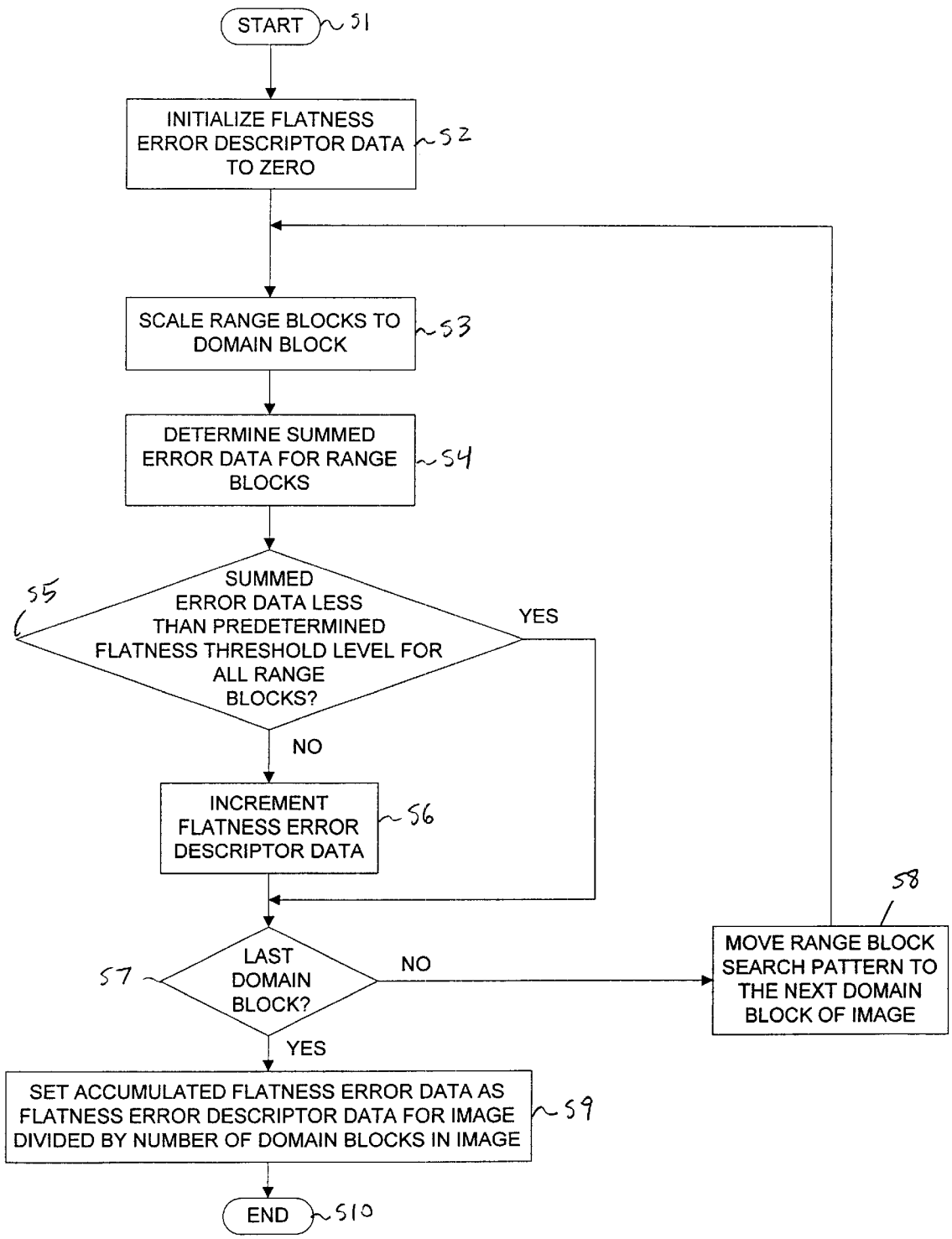

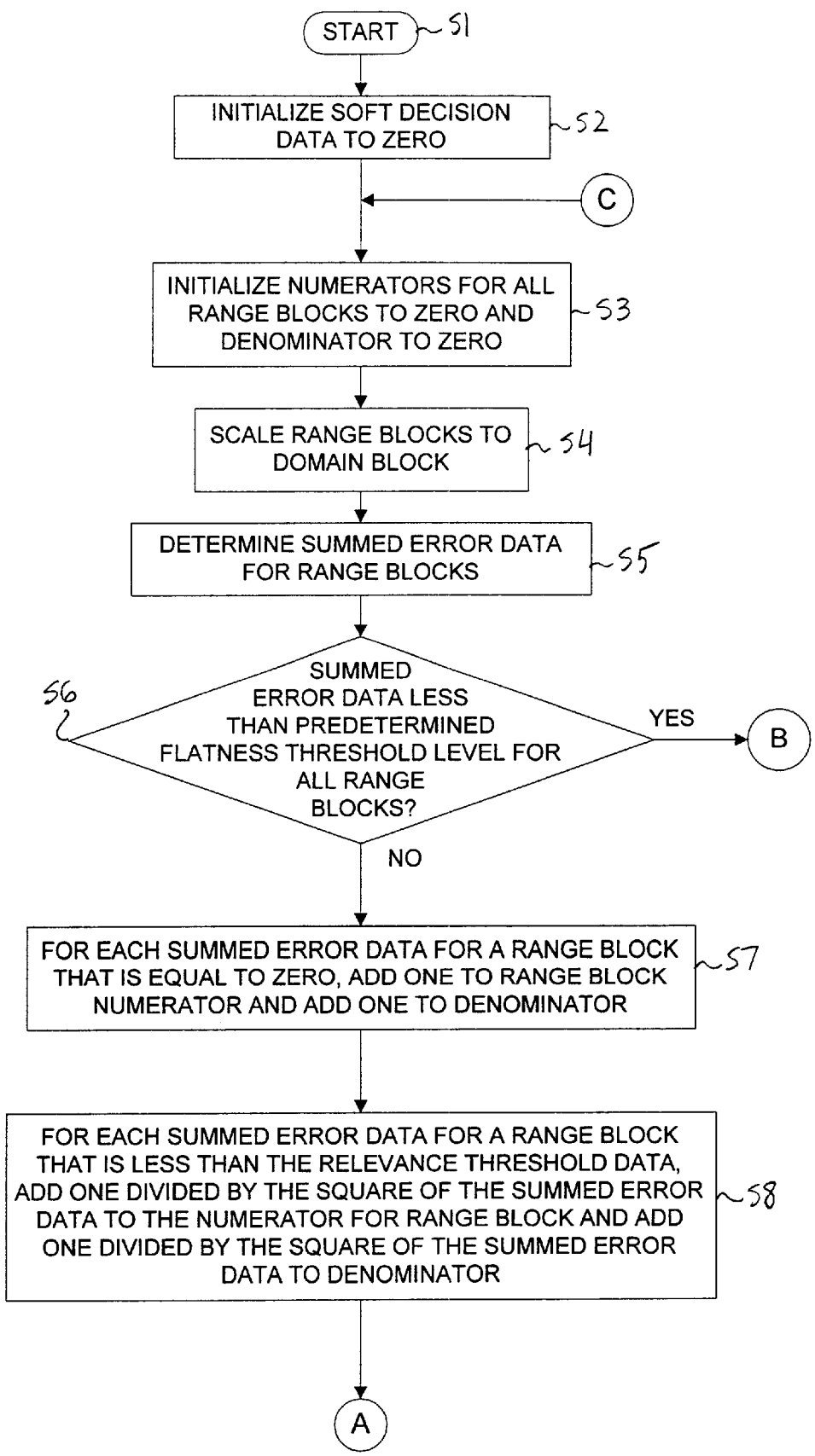

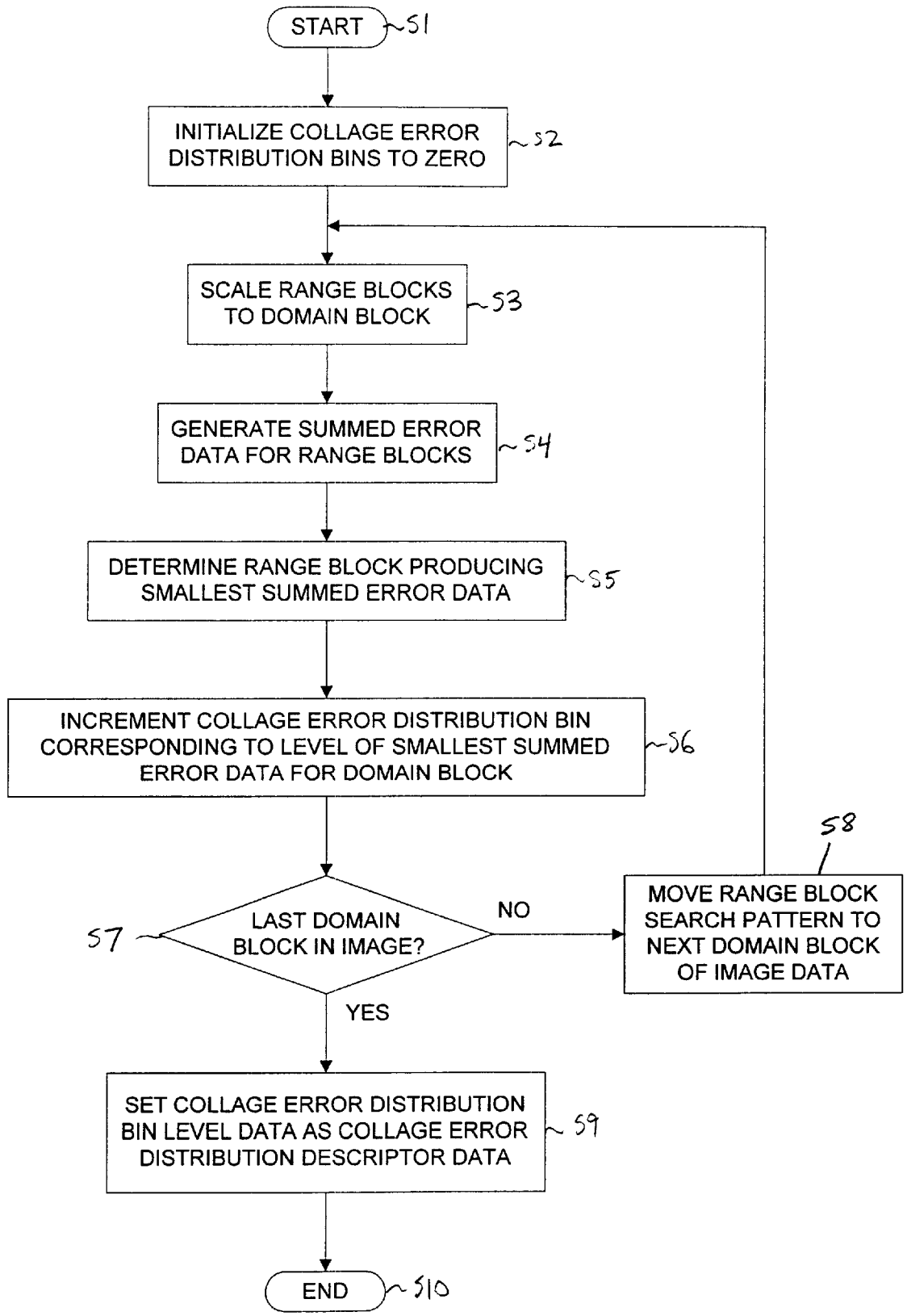

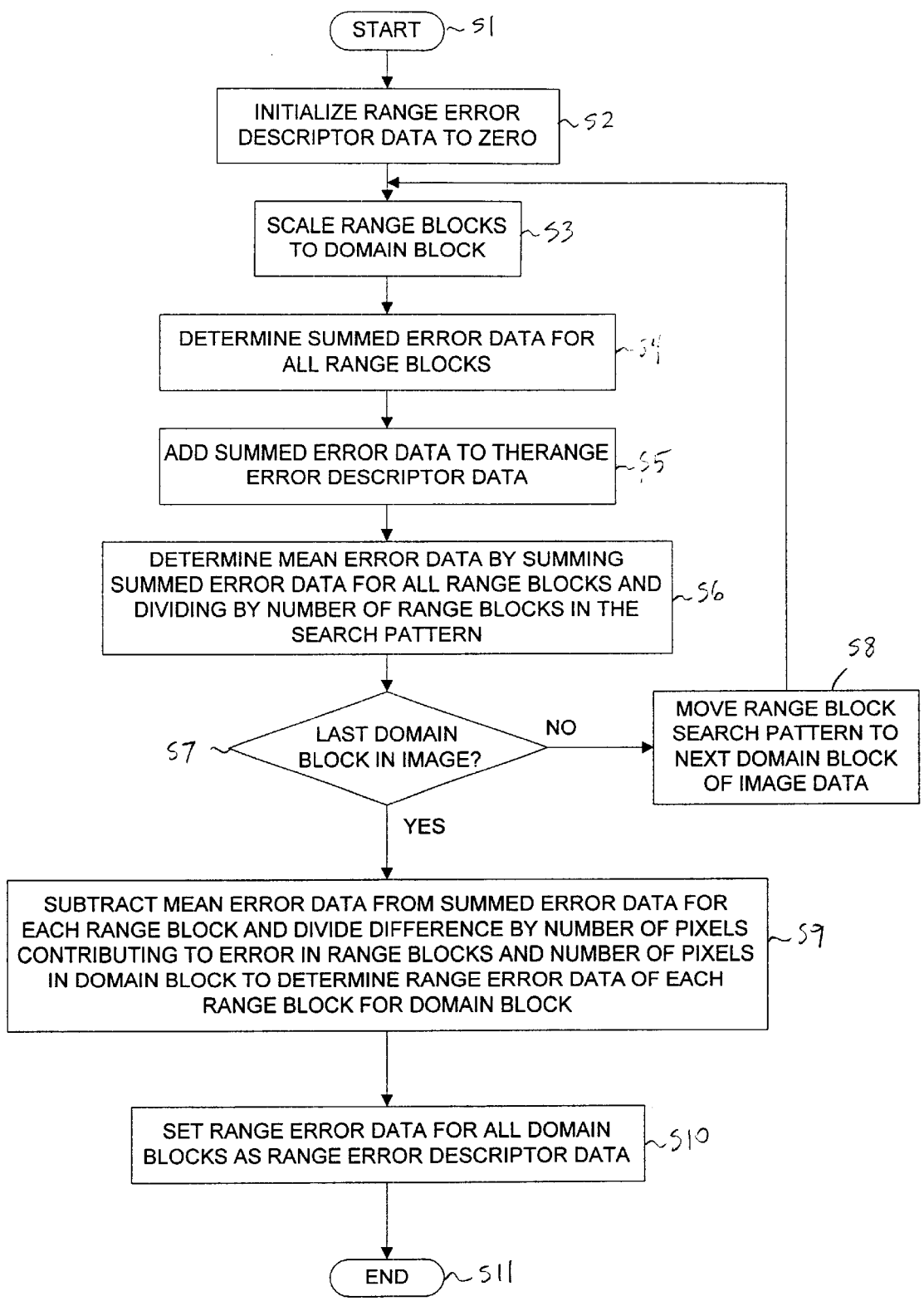

FIGURE 17

Collage Error Descriptor Data

Inputs: N = Size of Range Block Search Template
    E = Integer Variable
    Temp = temporary buffer of dimension N
    d = metric for comparison of domain and scaled down range blocks
    M = number of Domain Blocks to be processed
Outputs: Final values of E and M.
Descriptor: E/M.
Control Program:
    1. Initialize E to be 0: E = 0.
    2. For each Domain Block D:
        i. For each Range Block R in the Range Block Search Template over D:
            a. calculate the index of R, index(R).
            b. scale R to have the same resolution as D, call scaled R, R*.
            c. calculate d(D,R*) and store the value in Temp[index(R)].
        ii. Increment E by the smallest of Temp[0], Temp[1], . . . , Temp[N-1]:
            E = E + min {Temp[i] : i = 0, 1, 2, 3, . . . , N-1}.

FIGURE 18

Address Histogram Error Descriptor Data

Inputs: N = Size of Range Block Search Template
    A = Array of integers of dimension N+1
    Temp = temporary buffer of size N
    d = metric for comparison of domain and scaled down range blocks
    M = number of Domain Blocks to be processed
Output: Final contents of A.
Descriptor: The distribution of best addresses, with respect to the order implied by the Range Block Search Template, is given by the numbers $A[i]/A[N]$ for $i = 0,1,\ldots,N-1$.
Control Program:
1. Initialize array entries to be 0: for $i = 0$ to $i = N$, $A[i] = 0$.
2. For each Domain Block D:
    i. For each Range Block R in the Range Block Search Template over D:
    a. calculate the index of R, index(R)
    b. scale R to have the same resolution as D, call scaled R, $R^*$.
    c. calculate $d(D,R^*)$ and store the value in Temp[index(R)].
    ii. Define m = min{Temp[i] : i = 0, 1, 2, 3, . . . , N-1}, and let Index_Best = min {i : Temp[i] = m}. m is the smallest error made and Index_Best is the index of the first Range Block at which the minimal error was made.

iii. Increment A[Index_Best] by one: A[Index_Best] = A[Index_Best] + 1.
3. Let A[N] = M.

FIGURE 19

Flatness Error Descriptor Data

Inputs: N = Size of Range Block Search Template
A = integer variable
F = flatness threshold.
d = metric for comparison of domain and scaled down range blocks
M = number of Domain Blocks to be processed Output: Final contents of A.

Descriptor: A/M.
Control Program:
1. Initialize A = 0.
2. For each Domain Block D:
   i. For each Range Block R in the Range Block Search Template over D:
      a. calculate the index of R, index(R).
      b. scale R to have the same resolution as D, call scaled R, R*.
      c. calculate d(D,R*) and store the value in Temp[index(R)].
   ii. If for each i = 0,1,2,...,N-1, Temp[i] < F, set A = A + 1.

FIGURE 20

Soft Decision Error Descriptor Data

Inputs: N = Size of Range Block Search Template
        A = floating point variables of dimension N.
        Temp = temporary buffer of dimension N.
        S = floating point temporary variable.
        P = temporary buffer of dimension N.
    F = flatness threshold.
        K = relevance threshold, currently taken as infinity.
        d = metric for comparison of domain and scaled down range blocks Output: Final contents of A.

Descriptor: A.

Procedure:
1. Initialize array entries to be 0: for i = 0 to i = N-1, A[i] = 0.
2. For each Domain Block D:
    i. For each Range Block R in the Range Block Search Template over D:
       a. calculate the index of R, index(R).
       b. scale R to have the same resolution as D, call scaled R, R*.
       c. calculate d(D,R*) and store the value in Temp[index(R)].
       d. Initialize P[i] = 0 for i = 0,1,2,...N-1; and S = 0.
    ii. If for each i = 0,1,2,...,N-1, Temp[i] < F, go to the next Domain Block,
ELSE
    iii For i = 0,1,2,...N-1, if Temp[i] = 0, set P[i] = 1 and S = S + 1; otherwise
       if Temp[i] < K, set P[i] = 1/(Temp[i])^2 and S = S + P[i].
    iv. Reset P[i] = P[i]/S so that the P[i]'s add to 1.
    v. Increment A[i] = A[i] + P[i] for i=0,1,2,3,...N-1.
3. Let M = sum of A[i]'s and reset A[i] = A[i]/M. Descriptor is this new A.

FIGURE 21

Collage Error Distribution Descriptor Data

Inputs: N = Size of Range Block Search Template
L = number of bins for the histogram
E = Integer Array of dimension L + 1
Inf = lower threshold value for bin containing infinity.
Temp = temporary buffer of dimension N
V = temporary variable.
d = metric for comparison of domain and scaled down range blocks
M = number of Domain Blocks to be processed Outputs: E Descriptor: E.

Control Program:
1. Initialize contents of E to be 0: E[i] = 0 for i=0,1,2,3,...,L.
2. For each Domain Block D:
    i. For each Range Block R in the Range Block Search Template over D:
        a. calculate the index of R, index(R).
        b. scale R to have the same resolution as D, call scaled R, R*.
        c. calculate d(D,R*) and store the value in Temp[index(R)].
    ii. Let V be the smallest of Temp[0], Temp[1], ..., Temp[N-1]:
        V = min {Temp[i] : i = 0, 1, 2, 3, ..., N-1}.
    iii. If V ≥ Inf, increment E[L-1] by one: E[L-1] = E[L-1] +1; otherwise, for
        i=0,1,2,...,L-2, if i*(Inf)/(L-1) ≤ V < (i +1)*Inf/(L-1), increment E[i] by one.
        (NOTE: in this we have broken the interval [0, Inf) into pieces of equal length
        and based our histogram on this division. It is obvious that this can be
        extended to non-uniform divisions of the interval.)

FIGURE 22

Range Error Distribution Descriptor Data

Inputs: N = Size of Range Block Search Template
       A = Array of floating point numbers of dimension N
       B = Array of floating point numbers of dimension N
       d = metric for comparison of domain and scaled down range blocks
       M = number of Domain Blocks to be processed
       E = mean error Output: Final contents of A.

Descriptor: A

Control Program:
1. Initialize array entries to be 0: for i = 0 to i = N-1, A[i] = B[i] = 0.
2. For each Domain Block D:
    i. For each Range Block R in the Range Block Search Template over D:
       a. calculate the index of R, index(R).
       b. scale R to have the same resolution as D, call scaled R, R*.
       c. calculate d(D,R*) and store the value in Temp[index(R)].
       d. increment B[index(R)] by 1: B[index(r)] = B[index(R)] + 1.
    ii. For i=0,1,2,...N-1, increment A[i] by Temp[i]: A[i] = A[i] + Temp[i].
    iii. Calculate the mean error per Range Block as
E = (sum of A[i])/N for i=0,1,2,...N-1.
    iv. Reset A[i] to be
A[i] = (A[i] − E)/(B[i]*number of pixels in a Domain Block).

SYSTEM AND METHOD FOR PRODUCING DESCRIPTORS FOR IMAGE COMPRESSION

CROSS-REFERENCE TO RELATED APPLICATION

This application claims earlier filing benefits of U.S. Provisional Patent Application Serial No. 60/106,400, filed Oct. 30, 1998, naming Stephen George Demko, Keshi Chen and Mehdi Khosravi as inventors.

BACKGROUND OF THE INVENTION

1. Field of the Invention

This invented system and method are related to use of fractal-transform based descriptors as compact descriptors of an image. The system and method can also use the descriptors to search a database for target images similar to a source image.

2. Description of the Related Art

One fundamental problem in image management is the classification of imagery according to the presence or absence of particular features or textures. This problem is most notable in defense and medical applications when the presence of particular objects or artifacts can be the signal for further tests, increased monitoring, or other actions. While all images of a critical nature must be evaluated by an expert, a fast, reliable pre-screening methodology can contribute to the overall process by bringing those images that are most likely to contain an important object or artifact to the attention of the analyst. A related problem in image management is to describe entire images in terms of a small number of parameters with the goals of facilitating database retrieval and enabling a "query by content" mode for image data. The first problem can be viewed as a special case of the second: one can break the high resolution image into sub-images, possibly overlapping, and query a database consisting of descriptors of the subimages with descriptors of images consisting of the sought after objects, textures or artifacts. Pixel-to-pixel comparisons are not suitable for solving these problems, and several types of image descriptors and description schemes have been proposed for the solution over the last decade. These methods include the "Sloan" and "Marie-Julie" methods that use fractal transform (FT) codes to generate descriptors for an image.

In fractal image compression, an image of pixels is broken into equally-sized groups of pixels referred to as 'domain blocks'. Larger groups of pixels referred to as 'range blocks' are positioned adjacent or in near proximity to a particular domain block and are reduced to a size comparable to the domain block. The pixel intensities of the domain block are compared with those of the range blocks to determine a range block that is closest in intensity distribution to the domain block. The process is repeated domain-block-by-domain-block to determine range blocks closest in pixel intensity to respective domain blocks of the pixel image. This process allows intensity patterns that repeat within the image to be found and used to compress the image into a more compact, less data-intensive form. This is advantageous, for example, in transmitting images over communication media with limited bit rates. On the receiving end of the communication media, the compacted pixel image can be decompressed to obtain the original pixel image. The image can thus be transmitted in much less time than would otherwise be required.

The comparison of range and domain blocks yields error vectors indicative of the pixel-by-pixel error between the domain blocks and respective range blocks yielding the smallest error. Until the development of this invention, the error vector has been discarded after use in determining the range block closest to a particular domain block to compress an image. It would be desirable if some beneficial use could be found for this error vector which is a necessary by-product of many image compression processes.

SUMMARY OF THE INVENTION

A first method in accordance with the invention can be used with image data divided into domain blocks. A predetermined search pattern of range blocks centered on a domain block is defined for use in the method. The first method includes a step of generating at least one type of error descriptor data, based on domain block data and range block data. The error descriptor data can be derived by scaling the range blocks to the pixel size of a domain block and subtracting means of range blocks and domain block from the respective pixels thereof. The pixel intensity levels of the domain block are subtracted from the scaled, mean-adjusted pixel intensity levels of the range blocks to produce difference data. The absolute value of the difference data is taken and the difference data are summed to produce summed error data. The summed error data is used to derive at least one error descriptor data. The error descriptor data is a relatively compressed representation of the image data. The error descriptor data can include collage error descriptor data, address histogram error descriptor data, flatness error descriptor data, soft decision error descriptor data, collage error distribution descriptor data, and/or range error descriptor data.

A second method of the invention includes culling target error descriptor data for target images stored in a database, based on error descriptor data for a source image and at least one predetermined threshold level. The second method can also include scoring the culled target error descriptor data, and ranking the target error descriptor data by score to determine the relative closeness of the target images to the source image.

A system of the invention includes a processor generating error descriptor data for at least one image based on domain block data and range block data. The system can also include at least one memory coupled to the processor, for storing the domain block data, range block data, and error descriptor data. The memory can be used to store a database of error descriptor data for target images. The processor can be programmed to compare error descriptor data for the target images with the error descriptor data for the source image to cull and score error descriptor data of the target images to determine target images relatively similar to the source image. The system can further include an input device coupled to the processor, for generating a signal under manipulation by the user to select or indicate an image to be converted by the processor into error descriptor data. The system can further include a scanner coupled to the processor, for scanning an image to generate image data supplied to the processor. The processor can generate error descriptor data based on the scanned image data. In addition, the system can include a display unit coupled to the processor. The processor can generate display data based on the error descriptor data. The processor can be coupled to supply the display data supplied to the display unit to generate a visual display of at least one of the source and target images.

These together with other objects and advantages, which will become subsequently apparent, reside in the details of construction and operation as more fully hereinafter described and claimed, reference being made to the accompanying drawings, forming a part hereof, wherein like numerals refer to like parts through the several views.

BRIEF DESCRIPTION OF THE DRAWINGS

FIGS. 4A–4E are views of the methodology of determining the summed error data for each range block of the search pattern of FIGS. 2 and 3;

FIG. 11 is a flowchart of a methof for determining flatness descriptor data for an image;

FIGS. 12A and 12B are flowcharts for determining soft decision error descriptor data for an image;

FIG. 13 is a flow chart of a method for determining collage error distribution descriptor data for an image;

FIG. 14 is a flowchart of a method for determining range error descriptor data for an image;

FIGS. 17–22 are control programs for determining error descriptor data in accordance with this invention.

DESCRIPTION OF THE PREFERRED EMBODIMENTS

As used herein the following terms have the following meanings:

"domain block" is the smallest group unit of pixels into which image data is subdivided.

"error descriptor data" refers to data for a descriptor that is derived from error data generated by summed error data derived from differences between pixel intensity levels of a scaled range block and a domain block;

"range block" is generally twice the dimensions of a domain block and is a unit within a search pattern in proximity to a particular domain block in which repeating pixel patterns are sought.

Figure 1:
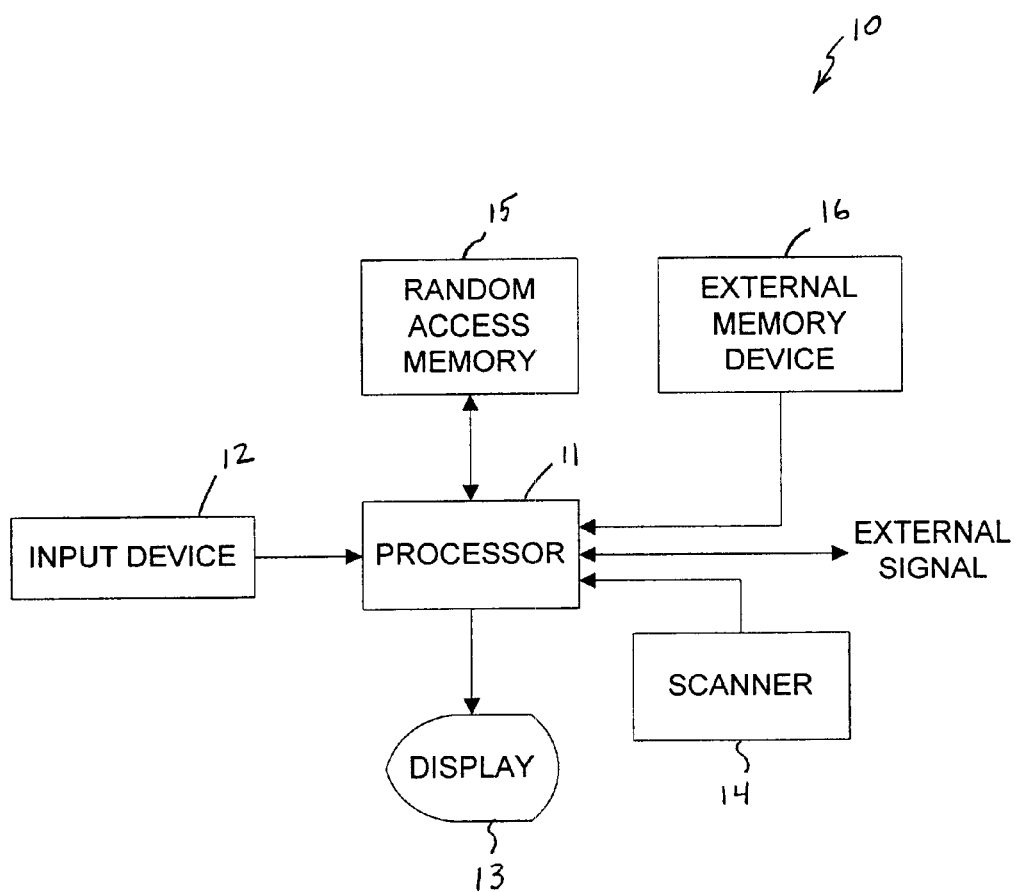
FIG. 1 is a block diagram of a system in accordance with this invention.

1. System for Producing Source Error Descriptor Data for Use in Searching a Database With Target Error Descriptor Data A system 10 that can be used to perform the methods disclosed herein is shown in FIG. 1. The system 10 includes a processor 11, an input device 12, a display unit 13, a scanner 14, a random access memory (RAM) 15, and an external memory device 16. The processor 11 can be a microprocessor such as one operating at a processing speed of 333 Megahertz or faster. Microprocessor units commercially-available under the trademarks Pentium II® or Pentium III® produced by Intel® Corporation, Santa Clara, Calif., or equivalent or more advanced generations of microprocessors, can be used for this purpose. The input device 12 can be a keyboard or mouse, for example. The display unit 13 can be a flat panel liquid crystal display (LCD) or cathode ray tube (CRT) or other device. The scanner 14 can be any commercially-available unit capable of generating image data to a predetermined desired pixel resolution. The RAM 15 can be tens or hundreds of Megabytes in size. The external memory device 16 can be a hard disk drive, server, or other memory device having data storage capacity sufficient to hold all images of a database. For example, the external memory device 16 can be hundreds or thousands of Megabytes or more in data storage capacity.

The processor 11 performs its processing based on its control program and data prestored in the RAM 15. The processor 11 is coupled to the input device 12 that can be used to permit a user to input source image data used by the processor. Optionally, the processor 11 can generate a display of possible source images amongst which the user can select a particular image via the input device 12 to serve as the source image to be used to search the database for target images. As yet another option, the scanner 14 can be used to scan an image to generate source image data supplied to the processor 11 to be used to search the database. The processor 11 converts the source image data from input device 12 into source error descriptor data. The processor 11 uses the source error descriptor data to search a database stored in the RAM 15 and/or the external memory device 16 for target error descriptor data corresponding to target images that are similar to the source image. The database can be prepared from image data generated by scanning different images via scanner 14 to produce image data converted by the processor 11 into target error descriptor data for the database stored by the processor in the RAM 15 and/or external memory device 16. If the processor 11 determines that any target error descriptor data are within a predetermined range of the source error descriptor data, the processor generates a display on unit 13 to permit the user to view such target images. As an optional feature, the processor 11 can be coupled to receive an external signal indicative of source error descriptor data for use in searching the database, or target error descriptor data for inclusion in the database stored in the RAM 15 and/or external memory device 16.

2. Preliminary Image Processing

Many images have dark borders that must be eliminated to avoid any adverse effect on error descriptor data computed from the image. The processor 11 can be programmed to eliminate dark borders by comparing pixel intensities at the border of the image data with a predetermined intensity level and discarding rows of pixels having no pixel level above the predetermined intensity level. The resulting image data is cropped to include only pixel intensities that are part of the image to prevent dark border pixels from skewing the error descriptor data representing such image.

3. Computation of Error Descriptor Data

Figure 2:
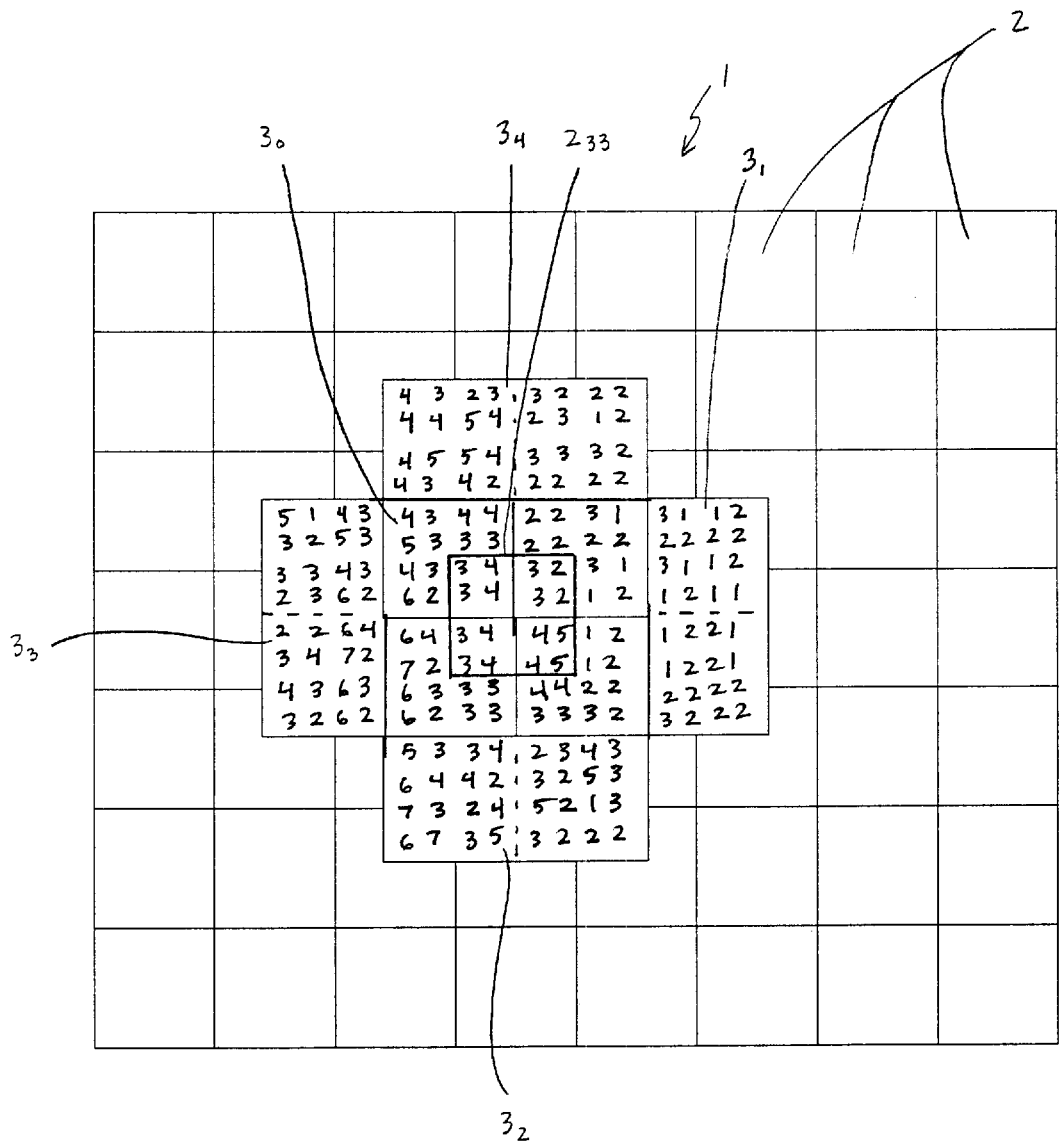
FIG. 2 is a relatively simplified embodiment of domain blocks and a range block search pattern for determining error descriptor data in accordance with the invention.
Figure 3:
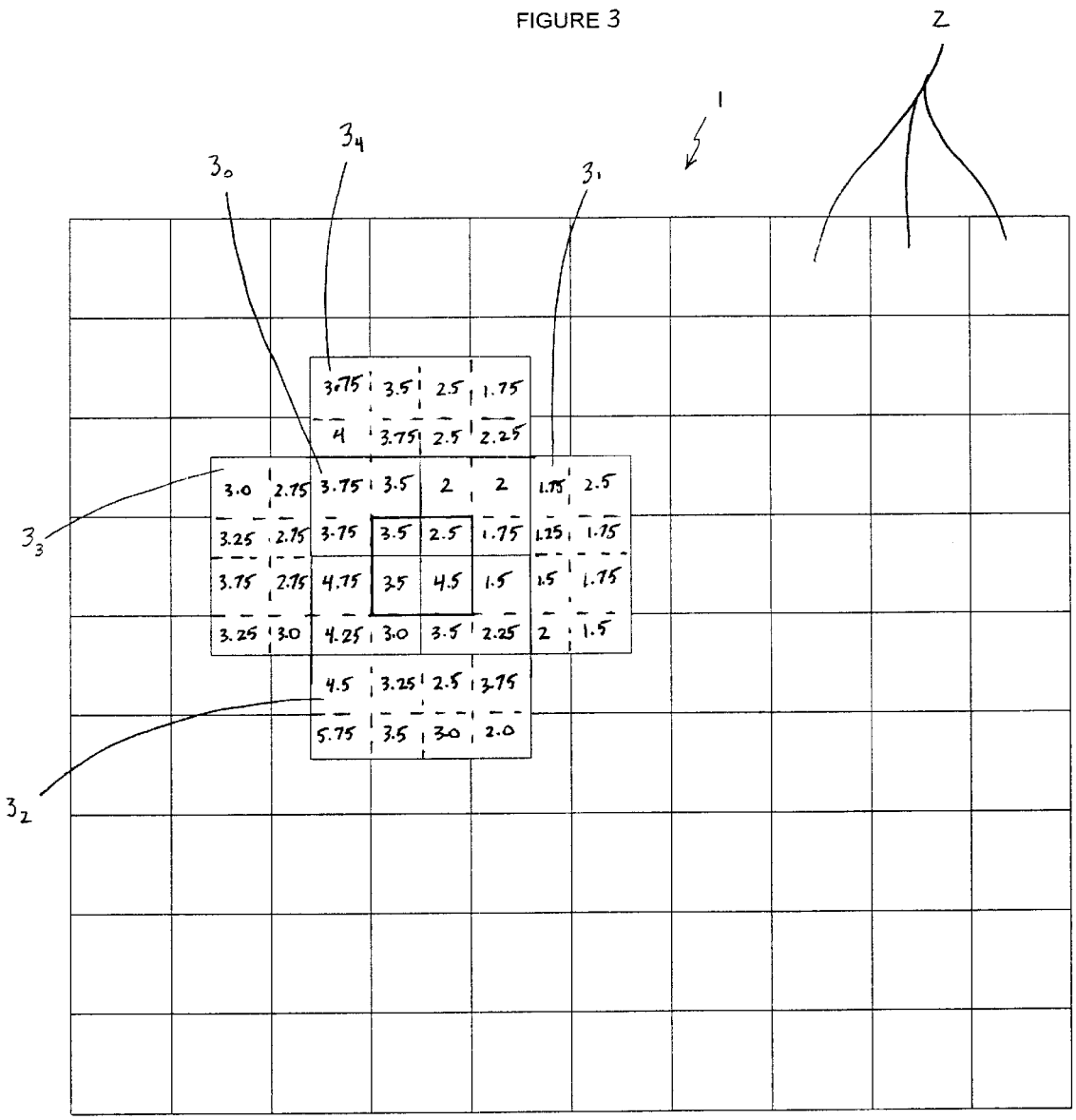
FIG. 3 is a view of range blocks scaled by averaging pixel values to reduce the size of the range blocks to that of the domain blocks.

A relatively specific description for calculating error descriptor data by comparing a particular domain block and respective range blocks is described with respect to FIGS. 2, 3, and 4A–4E. In FIGS. 2 and 3, the pixels of an image 1 are divided into a plurality of equally-sized domain blocks 2. The pixels have intensities ranging in a gray scale from 0–7. In FIGS. 2 and 3, there are eight rows and eight columns of domain blocks numbered from 0–7. The domain blocks 2 have four-by-four (4×4) dimensions with four pixels across and four pixels down. A particular domain block $2_{33}$ is shown in FIGS. 2 and 3. Range blocks $3_0$–$3_4$ are shown arranged over and in near proximity to the domain block $2_{33}$. The range blocks 3 are twice the size of the domain blocks 2 and thus are eight by eight (8×8). The range block $3_0$ is positioned immediately over the domain block $2_{33}$ and the range blocks $3_1$, $3_2$, $3_3$, $3_4$ are positioned to the right, bottom, left and top, respectively, of the domain block $2_{33}$. To calculate error vectors for each of the range blocks, the pixel levels of the range blocks must be reduced to the size of the domain block $2_{33}$. This can be accomplished either by taking one pixel value for each two-by-two (2×2) pixel array in the range block and ignoring the others. More preferably, the pixel levels of all pixels in the 2×2 pixel array can be averaged to provide a single average pixel level for each 2×2 pixel array, as shown in FIG. 3. In FIG. 4A, the mean of the domain block (in this case 3.5) is subtracted from all pixel intensity levels. The mean of the range block $3_0$ (in this case 3.125) is subtracted from all averaged pixel levels thereof. The error vector for the first range block $3_0$ is calculated by subtracting the mean-adjusted, averaged pixel levels of the range block $3_0$ from corresponding mean-adjusted pixel levels of the domain block $2_{33}$. The absolute value of all pixel levels of the error vector are summed to produce a summed error level (in this case totaling 11.375). In FIG. 4B, the mean of the domain block (in this case 3.5) is subtracted from all pixel intensity levels thereof. The mean of the range block $3_1$ (in this case 2.125) is subtracted from all averaged pixel levels thereof. The error vector for the second range block $3_1$ is calculated by subtracting the mean-adjusted, averaged pixel levels of the range block $3_1$ from corresponding mean-adjusted pixel levels of the domain block $2_{33}$ to produce the error vector. The absolute value of the resulting differences is taken and summed to produce a summed error level totaling 17.5. In FIG. 4C, the mean of the domain block (in this case 3.5) is subtracted from all pixel intensity levels thereof. The mean of the range block $3_2$ (in this case 3.469) is subtracted from all averaged pixel levels thereof. The error vector for the third range block $3_2$ is calculated by subtracting the mean-adjusted, averaged pixel levels of the range block $3_2$ from corresponding mean-adjusted pixel levels of the domain block $2_{33}$ to produce the error vector. The absolute value of the resulting differences is taken and summed to produce a summed error level totaling 19.438. In FIG. 4D, the mean of the domain block (in this case 3.5) is subtracted from all pixel intensity levels thereof. The mean of the range block $3_3$ (in this case 3.406) is subtracted from all averaged pixel levels thereof. The error vector for the fourth range block $3_3$ is calculated by subtracting the mean-adjusted, averaged pixel levels of the range block $3_3$ from corresponding mean-adjusted pixel levels of the domain block $2_{33}$ to produce the error vector. The absolute value of the resulting differences is taken and summed to produce a summed error level totaling 15.688. In FIG. 4E, the mean of the domain block (in this case 3.5) is subtracted from all pixel intensity levels thereof. The mean of the range block $3_4$ (in this case 2.922) is subtracted from all averaged pixel levels thereof. The error vector for the fifth range block $3_4$ is calculated by subtracting the mean-adjusted, averaged pixel levels of the range block $3_4$ corresponding mean-adjusted pixel levels of the domain block $2_{33}$ to produce the error vector. The absolute value of the resulting differences is taken and summed to produce a summed error level totaling 14.218. Comparing the summed error data levels, the range block $3_0$ produces the smallest error level. The range block $3_0$ is selected as the range block that most closely represents the domain block $2_{33}$. The process described with reference to FIGS. 2, 3, 4A–4E is repeated domain-block-by-domain-block to obtain an error vector corresponding to the range block that most closely represents each domain block, for all domain blocks of the image. The summed error level for the range block closest to a particular domain block, as well as the address of the range block, are used to compute error descriptor data in accordance with the present invention.

Figure 5:
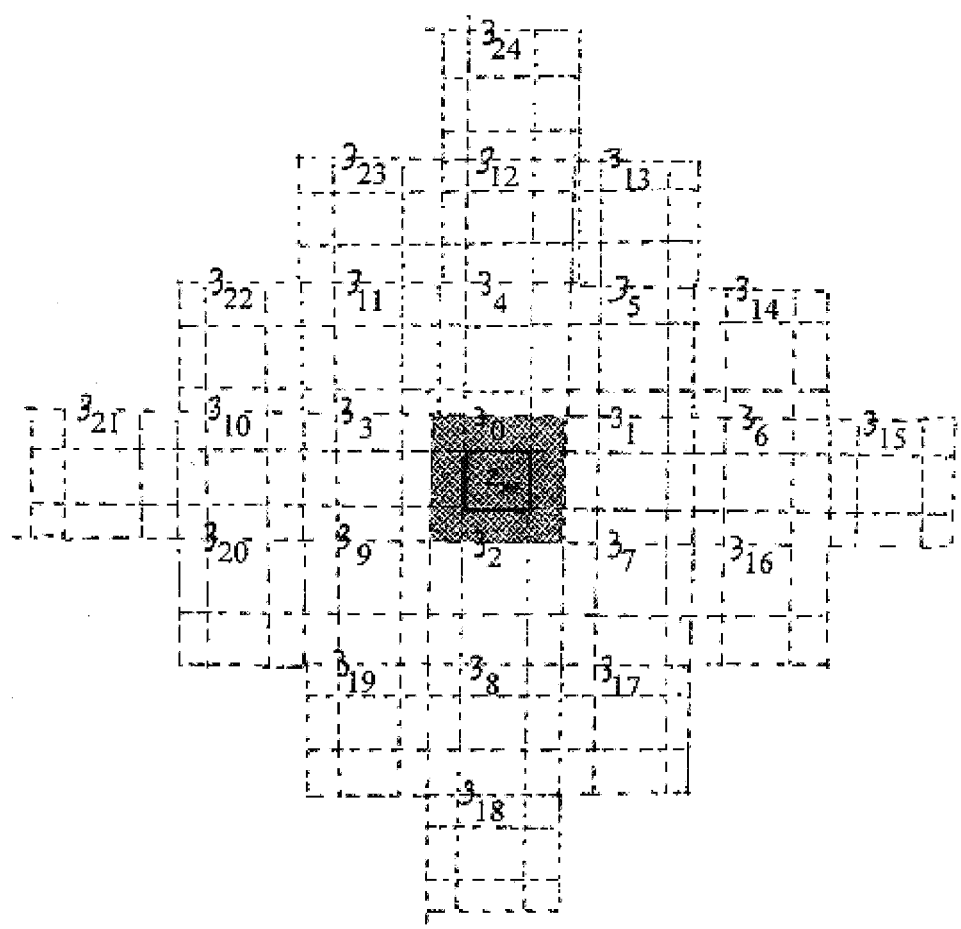
FIG. 5 is a view of a preferred range block search pattern for use in determining error descriptor data.

The foregoing example is a relatively simplified example as to how to compute the error vector for a particular domain block using only five range blocks. This example is greatly simplified, however, and in the preferred implementation, twenty-five range blocks are used for each domain block to determine the range block closest to each domain block and the corresponding summed error level and address, as shown in FIG. 5. The range blocks $3_0$–$3_{24}$ spiral around the domain block $2_{xx}$ where the 'x' represents the fact that the domain block could be any one of the domain blocks within the image 1. The arrangement of range blocks may be referred to hereinafter as the search pattern or search template used to generate summed error data. The invented methods can be applied to pixel arrays of virtually any size and can be used with 512×512 or 1024×1024 pixel arrays, for example.

4. Generalized Methods

Figure 6:
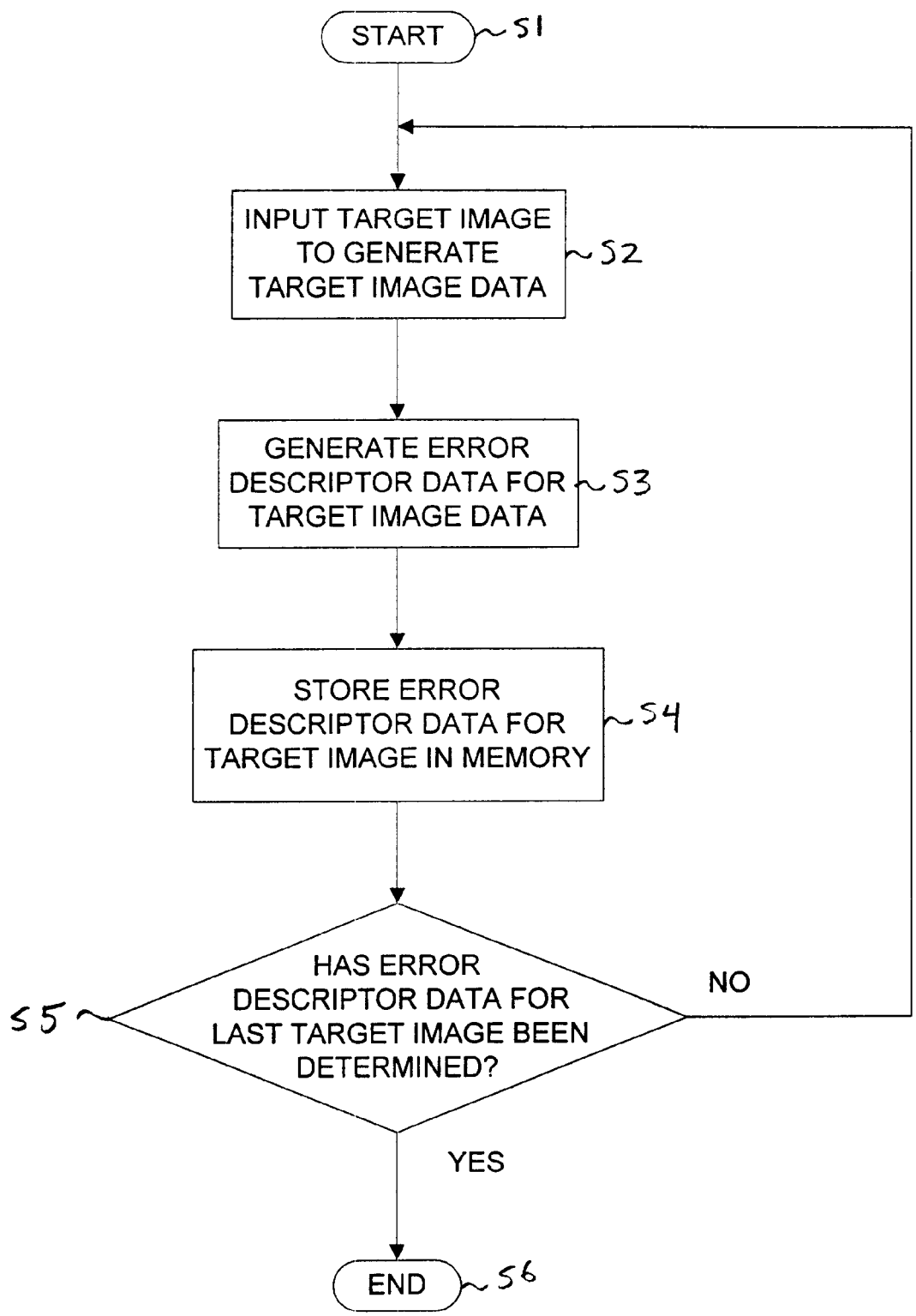
FIG. 6 is a flowchart of processing performed by a processor to compute error descriptor data for one or more target images of a database.

FIG. 6 is a generalized method as to how a database of image descriptors is prepared in accordance with the invention. In step S1 of FIG. 6, the method starts. In step S2, a target image is scanned to generate target image data. Step S2 can be performed via the scanner 14 to supply the target image data to the processor 11 that stores the target image data in the RAM 15 and/or external memory device 16. In step S3, error descriptor data is generated based on the target image data. Step S3 can be performed by the processor 11. In step S4, the error descriptor data for the target image is stored. The processor 11 can perform step S4 by supplying the error descriptor data for the target image to the external memory device 16. In step S5, a determination is made to establish whether the descriptor data for the last target image has been determined. This step can be performed by the user by using input device 12 to generate a signal supplied to the processor 11 to indicate whether the last target image has been supplied to the processor. If not, step S2 and subsequent steps are repeated. On the other hand, if the determination in step S5 is affirmative, in step S6, the method of FIG. 6 ends.

Figure 7:
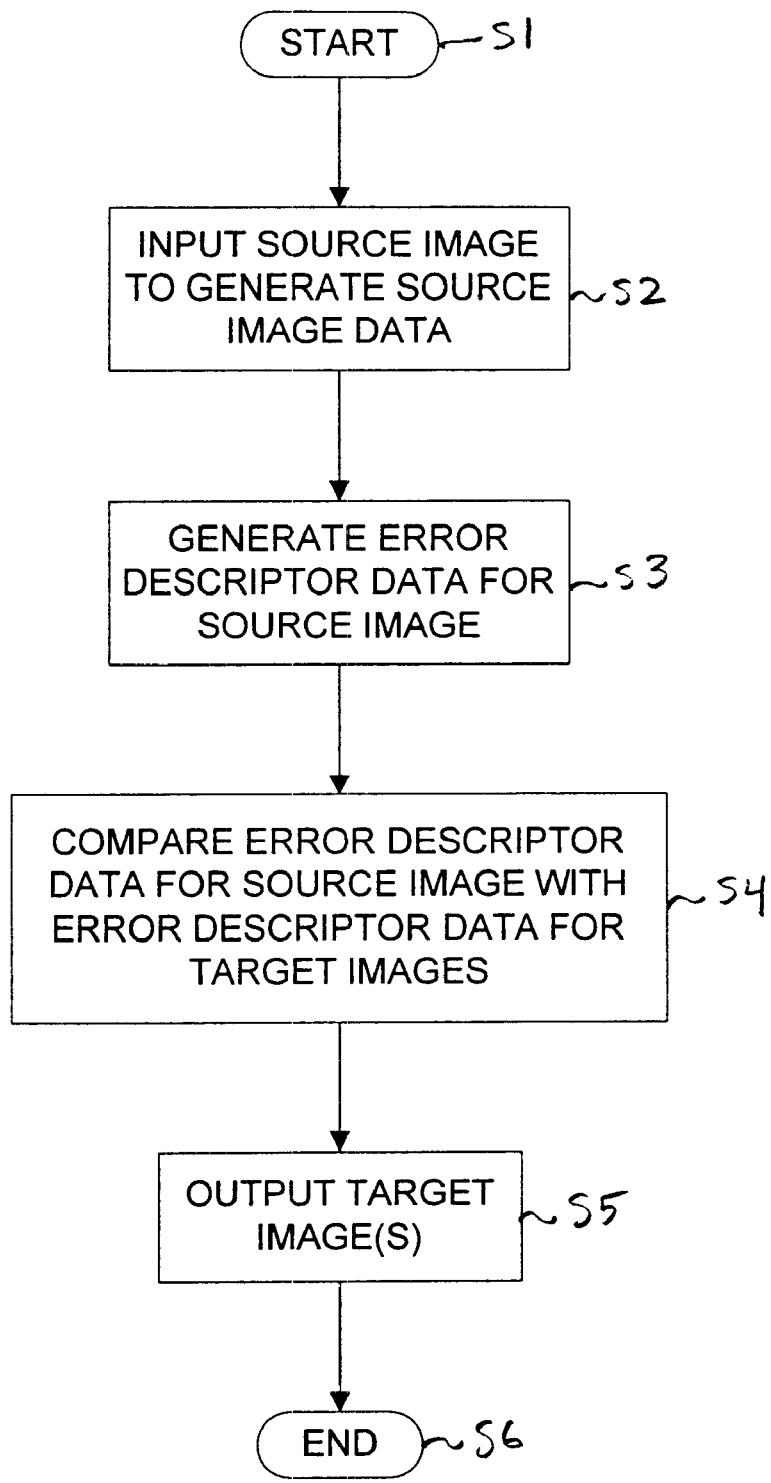
FIG. 7 is a flowchart of a method for using error descriptor data of a source image to search error descriptor data of target images in a database.

FIG. 7 is a generalized method of the manner of searching a database of target images for any that may be similar to a source image. In step S1, the method of FIG. 7 begins. In step S2, a source image is scanned to generate source image data. Such step can be performed by the scanner 14 to supply the source image data to the processor 11. In step S3, error descriptor data is generated based on the source image data. This step can be performed by the processor 11 in a manner similar to the manner in which the error descriptor data was calculated in the method of FIG. 6. The processor 11 can store the error descriptor data in the RAM 15. In step S4, the error descriptor data for the source image is compared with the error descriptor data for target images to determine whether any are similar to the source image. The processor 11 can perform this step by retrieving error descriptor data for the target image(s) from the external memory device 16 and comparing the error descriptor data for the target image (s) with the error descriptor data for the source image. In step S5, the target image(s) data relatively close to the source image data are output. This step can be performed by the processor 11 by generating display data based on the source image data, and by supplying the display data to unit 13 to generate a visual display of the target image(s). In step S6, the method of FIG. 7 ends.

5. Relatively Specific Methods for Determining Error Descriptor Data

The methods described with respect to FIGS. 8–15 can be used to calculate six different types of error descriptor data. Together with one other descriptor derived from pixel color, these error descriptor data can be used as compressed data representative of an image. The methods of FIGS. 8–15 can be used either for generation of error descriptor data for a database of target images, or to generate error descriptor data for a source image for use in searching a database of target images.

Figure 8:
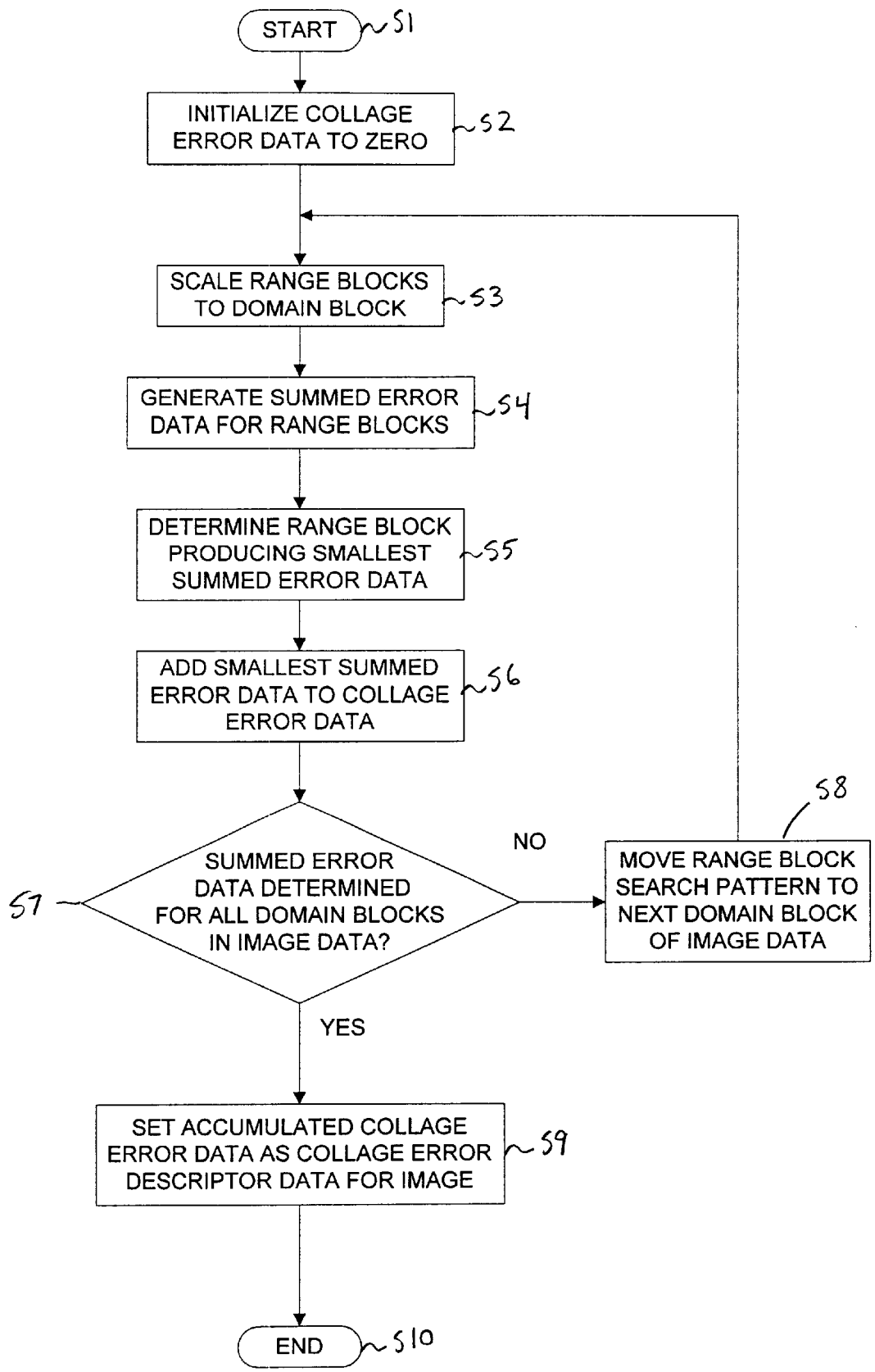
FIG. 8 is a flowchart of a method for determining collage error descriptor data.

In FIG. 8, a method for determining the collage error descriptor data begins in step S1. In step S2, the processor 11 initializes collage error data in RAM 15 to zero. The processor 11 is preferably programmed to begin the search pattern centered at the first pixel of the image data for which error descriptor data is to be determined. In step S3, the processor 11 scales the range blocks of the search pattern to the same size as the domain block on which the search pattern is centered. This can be performed either by averaging groups of pixels to reduce the size of the range blocks to that of the domain blocks, or by discarding certain pixels and keeping others for use in computing the error descriptor data, as previously described. In step S4, the processor 11 subtracts the mean of the domain block pixel intensity levels from each pixel level of the domain block. The processor 11 can also subtract the mean of the range block pixel levels for each pixel thereof to produce mean adjusted range block pixel intensity levels. The processor 11 subtracts the mean-adjusted averaged pixel intensity levels of the range blocks from the mean-adjusted pixel intensity levels of the domain block to generate error vector data. The absolute value of the error vector data is taken and the resulting positive levels are summed to produce summed error data. The processor 11 stores the summed error data in the RAM 15 for all range blocks of the domain block under analysis. In step S5, the processor 11 determines the range block producing the smallest summed error data level. In step S6, the processor adds the smallest summed error data to the collage data stored in RAM 15. In step S7, the processor 11 determines whether the summed error data has been determined for all domain blocks in the image data. If not, in step S8, the processor 11 in effect moves the range block search pattern to the next domain block of the image data. After performance of step S8, step S3 and subsequent steps are repeated. On the other hand, if the determination in step S7 is negative, in step S9, the processor 11 sets the accumulated collage error data as the collage error descriptor data for the image. In step S10, the method of FIG. 8 for computing the collage error descriptor data of an image ends.

Figure 9:
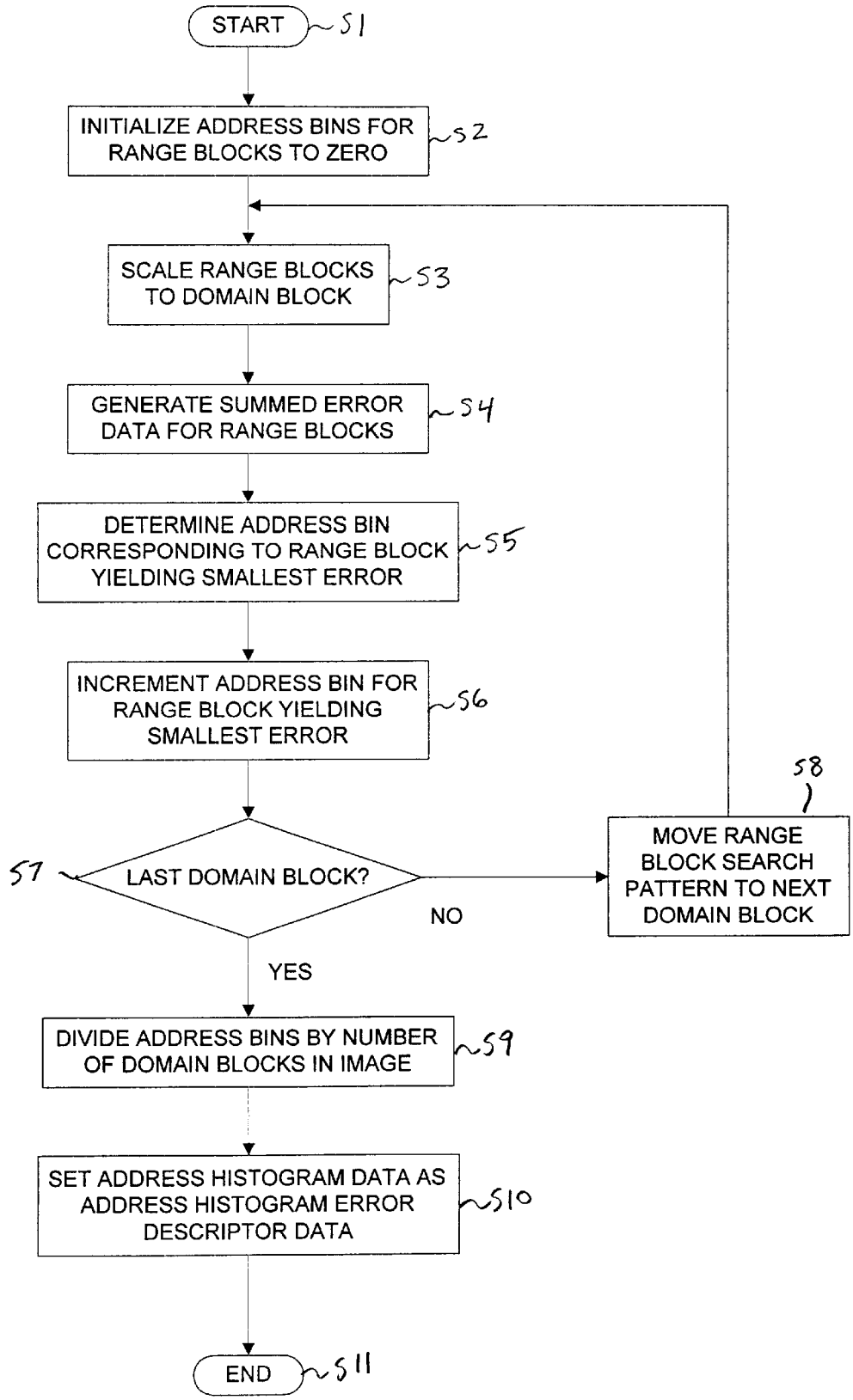
FIG. 9 is a flowchart of a method for determining address histogram error descriptor data.

In FIG. 9, a method for determining address histogram error descriptor data begins in step S1. In step S2, the processor 11 initializes to zero all address bins corresponding to the range blocks in the search pattern that are stored at respective memory locations in RAM 15. In step S3, the processor 11 scales the range block to the same size as the domain block in a manner as previously described. In step S4, the processor 11 generates summed error data for all range blocks in a search pattern centered on the domain block under analysis. More specifically, the processor 11 determines the mean of each range block and subtracts such mean from the scaled range block pixel levels. The processor 11 also determines the mean for the domain block and subtracts the mean from the pixel intensity levels of the domain block. The processor 11 subtracts the mean-adjusted, scaled range block pixel intensity levels from the mean-adjusted pixels of the domain block. The resulting pixel levels are subtracted to produce difference data. The processor 11 takes the absolute value of the difference data and sums the positive levels to produce the summed error data. The processor 11 repeats this procedure for all range blocks. In step S5, the processor 11 determines the address bin corresponding to the range block yielding the smallest error. In step S6, the processor 11 increments the bin stored in the RAM 15 that corresponds to the summed error data for the range block yielding the smallest summed error data. In step S7, the processor 11 determines whether the last domain block has been processed. If not, in step S8, the processor 11 in effect moves the range block search pattern to the next domain block. Thereafter, step S3 and subsequent steps are repeated. On the other hand, if the determination in step S7 is affirmative, in step S9, the processor 11 divides the accumulated counts of respective address bins by the number of domain blocks in the image. In step S10, the processor 11 sets the dividends resulting from step S9 as the address histogram error descriptor data. In step S11, the method of FIG. 9 ends.

Figure 10:
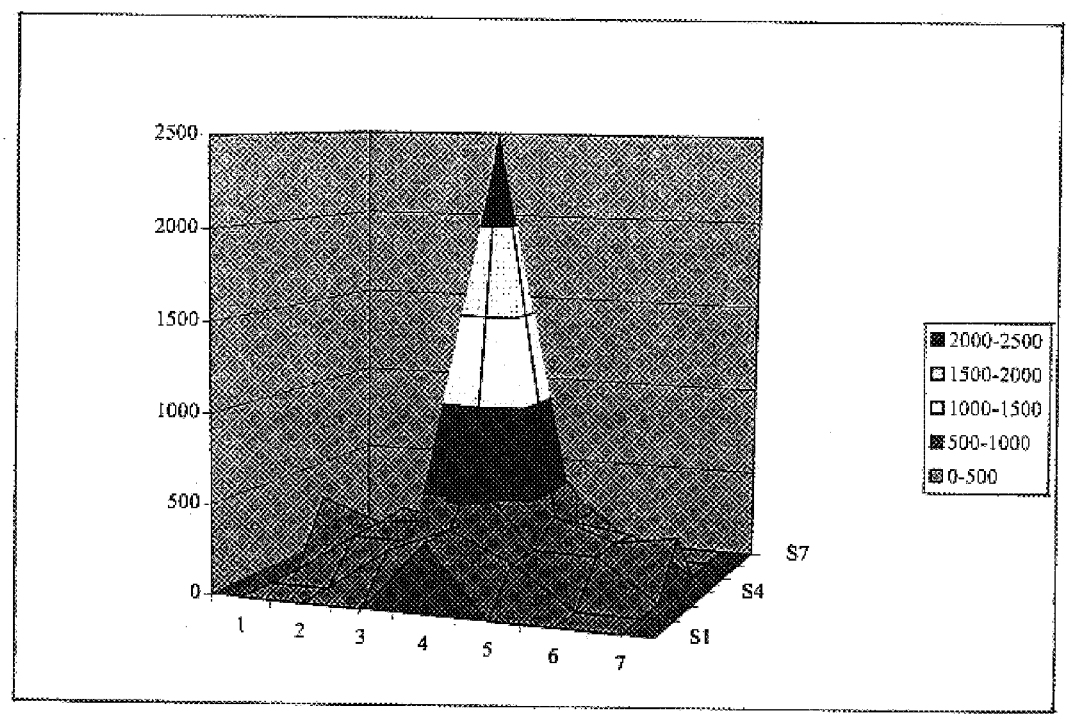
FIG. 10 is a graphical view of address histogram error descriptor data prepared for a particular image.

FIG. 10 is an exemplary graphical view of the address histogram error descriptor data computed over an entire image. The address histogram error descriptor data is a relatively compressed, yet highly representative, representation of an image.

FIG. 11 is a method for determining flatness error descriptor data. In step S1, the method of FIG. 11 begins. In step S2, the processor 11 initializes flatness error descriptor data to zero. The processor 11 also centers the range block search pattern on the first domain block of the image data. In step S3, the processor 11 scales the range blocks to the domain block. In step S4, the processor 11 determines the summed error data for the range blocks. More specifically, the processor 11 determines the means of the range blocks and subtracts the means from respective scaled pixel intensity levels to produce mean-adjusted range blocks. The processor 11 also determines the mean of the domain block pixel intensity levels and subtracts such mean from the pixel intensity levels of the domain block. The processor 11 subtracts the mean-adjusted, scaled range block pixel intensity levels from the mean-adjusted domain block intensity levels to determine difference data for the range blocks. The processor 11 determines the absolute value of the pixel intensity levels of the difference data of all range blocks and sums the resulting positive levels to determine summed error data for the range blocks. In step S5, the processor 11 determines whether the summed error data is less than predetermined flatness threshold level for all range blocks. If not, in step S6, the processor 11 increments flatness error descriptor data stored in the RAM 15. On the other hand, if the determination in step S5 is affirmative, in step S7, the processor 11 determines whether the last domain block in the image data has been processed. If not, in step S8, the processor 11 in effect advances the range block search pattern to the next domain block of the image and control proceeds to step S3. On the other hand, if the determination in step S7 is affirmative, in step S9, the processor 11 sets the accumulated flatness error data as flatness error descriptor data for the image under analysis. In step S10, the method of FIG. 11 ends.

Figure 12B:
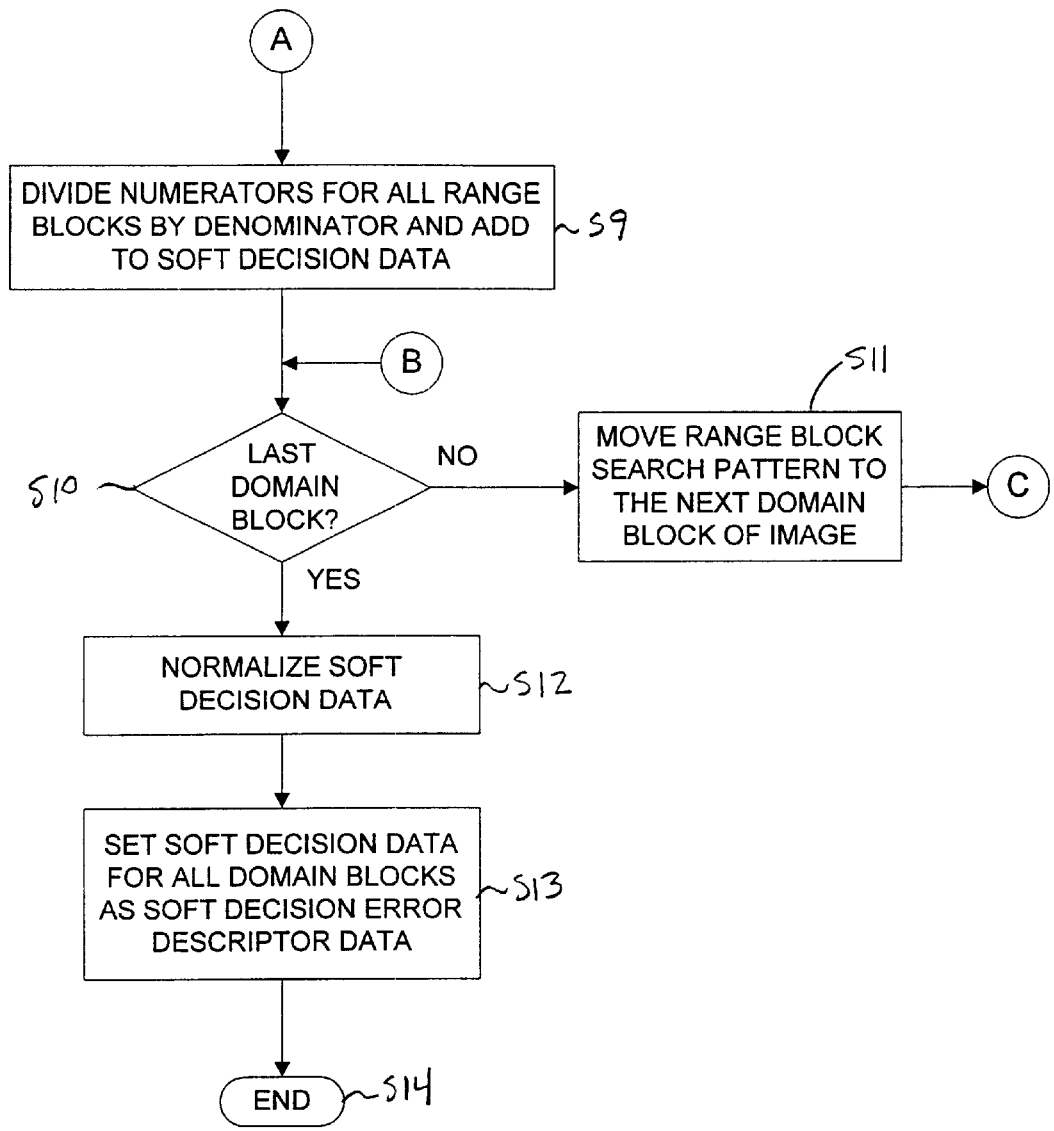

In FIGS. 12A and 12B, the method for determining soft decision error descriptor data begins in step S1 of FIG. 12A. The processor 11 begins the method of FIGS. 12A and 12B with the range block search pattern centered at the first domain block of the image data. In step S2, the processor 11 initializes soft decision error descriptor data-stored in the RAM 15 to zero. In step S3, the processor 11 initializes the numerators for all range blocks to zero and the denominator to zero. In step S4, the processor 11 scales the range blocks to the same size as the domain block. In step S5, the processor 11 determines the summed error data for all range blocks of the search pattern for the domain block under analysis. More specifically, the processor 11 determines the means of the range blocks and subtracts the means from respective scaled pixel intensity levels to produce mean-adjusted range blocks. The processor 11 also determines the mean of the domain block pixel intensity levels and subtracts such mean from the pixel intensity levels of the domain block. The processor 11 subtracts the mean-adjusted, scaled range block pixel intensity levels from the mean-adjusted domain block pixel intensity levels to determine difference data for the range blocks. The processor II determines the absolute value of the difference data for all range blocks and sums the resulting positive levels to determine summed error data for the range blocks. In step S6, the processor 11 performs a determination to establish whether the summed error data is less than a predetermined flatness threshold level for all range blocks. If the determination in step S6 is negative, in step S7 the processor 11 sets the numerator data for a range block to one and adds one to the denominator, for all those range blocks that have a summed error data equal to zero. In step S8, for each summed error data for a range block that is less than predetermined relevance threshold data stored in the RAM 15, the processor 11 sets the range block numerator equal to one divided by the square of the summed error data of the range block. The processor 11 also adds one divided by the square of the summed error data to the denominator data. In step S9 of FIG. 12B, the processor 11 divides the numerator for all range blocks by the denominator data to generate the soft decision data for the domain block under analysis. If the determination in step S6 is affirmative or after performance of step S9, a determination is made in step S10 to establish whether the last domain block has been processed. If not, in step S11, the processor 11 in effect moves the range block search pattern to the next domain block of the image and repeats step S3 and subsequent steps. On the other hand, if the determination in step S10 is affirmative, in step S12 the processor 11 normalizes the soft decision data. In step S13, the processor 11 sets the soft decision data as the soft decision error descriptor data generated by the processor in the performance of the method of FIGS. 12A and 12B. In step S14, the method of FIGS. 12A and 12B ends.

In FIG. 13, the method for determining collage error distribution descriptor data for image data begins in step S1. In step S2, the processor 11 initializes a plurality of collage error distribution bins to zero. The collage error distribution bins are in substance respective memory locations in the RAM 15. In step S3 the processor 11 scales the range blocks of the search pattern to the same size as the domain block. In step S4, the processor 11 generates summed error data for all range blocks in the search pattern. More specifically, the processor 11 determines the means of the range blocks and subtracts the means from respective scaled pixel intensity levels to produce mean-adjusted range blocks. The processor 11 also determines the mean of the domain block pixel intensity levels and subtracts such mean from the pixel intensity levels of the domain block. The processor 11 subtracts the mean-adjusted, scaled range block pixel intensity levels from the mean-adjusted domain block intensity levels to determine difference data for the range blocks. The processor 11 determines the absolute value of the pixel intensity levels of the difference data for all range blocks and sums the resulting positive levels to determine summed error data for the range blocks. In step S5, the processor 11 determines the range block that produces the smallest summed error data among all range blocks. In step S6, the processor 11 increments the collage error distribution bin corresponding to the level of the summed error data for the domain block under analysis. For example, for a 512×512 pixel image data, the ranges of collage error distribution bins could be from 0 to under 5, from 5 to under 10, from 10 to under 30, from 30 to under 50, and 50 or more. In step S7, the processor 11 determines whether the last domain block in the image data has been analyzed. If not, in step S8, the processor in effect moves the range block search pattern to the next domain block of the image data, and repeats step S3 and subsequent steps. On the other hand, if the determination in step S7 is affirmative, in step S9, the processor 11 sets the collage error distribution bin level data as collage error distribution descriptor data. In step S10, the method of FIG. 13 ends.

In step S1 of FIG. 14, processing performed by the processor 11 to determine range error descriptor data for an image begins in step S1. The processor 11 begins the processing of FIG. 14 at the first domain block of the image data. In step S2, the processor 11 initializes the range error descriptor data to zero. In step S3, the processor 11 scales the range blocks to the same size as the domain block. In step S4, the processor 11 generates summed error data for all range blocks for the domain block under analysis. More specifically, the processor 11 determines the means of the range blocks and subtracts the means from respective scaled pixel intensity levels to produce mean-adjusted range blocks. The processor 11 also determines the mean of the domain block pixel intensity levels and subtracts such mean from the pixel intensity levels of the domain block. The processor 11 subtracts the mean-adjusted, scaled range block pixel intensity levels from the mean-adjusted pixel intensity levels of the domain block to determine difference data for the range blocks. The processor 11 determines the absolute value of the pixel intensity levels of the difference data of all range blocks and sums the resulting positive levels to determine summed error data for the range blocks. In step S5, the processor 11 adds the summed error data to the range error descriptor data. In step S6, the processor 11 determines the mean error data by summing the summed error data for all range blocks and dividing by the number of range blocks in the search pattern. In step S7, the processor 11 performs a determination to establish whether the processor 11 has generated summed error data for the last domain block. If not, in step S8, the processor 11 in effect moves the range block search pattern to the next domain block of image data. On the other hand, if the determination in step S7 is affirmative, in step S9 the processor 11 subtracts the mean error data from the summed error data for each range block and divides the difference by the number of pixels contributing to the error in the range blocks and number of pixels in the domain block, to determine the range error data of each range block for the domain block under analysis. The division by the number of pixels contributing to the error in the range block accounts for the fact that if the domain block is centered at a location near the periphery of the image, some of the range blocks may be out located out of the boundary of the image data. Accordingly, the number of pixels of the range blocks that contribute to the error is tracked to ensure that the mean error data is not skewed at the image's edge. In step S10, the processor 11 sets the range error data for all domain blocks as the range error descriptor data for the image. In step S11, the method of FIG. 14 ends.

Figure 15:
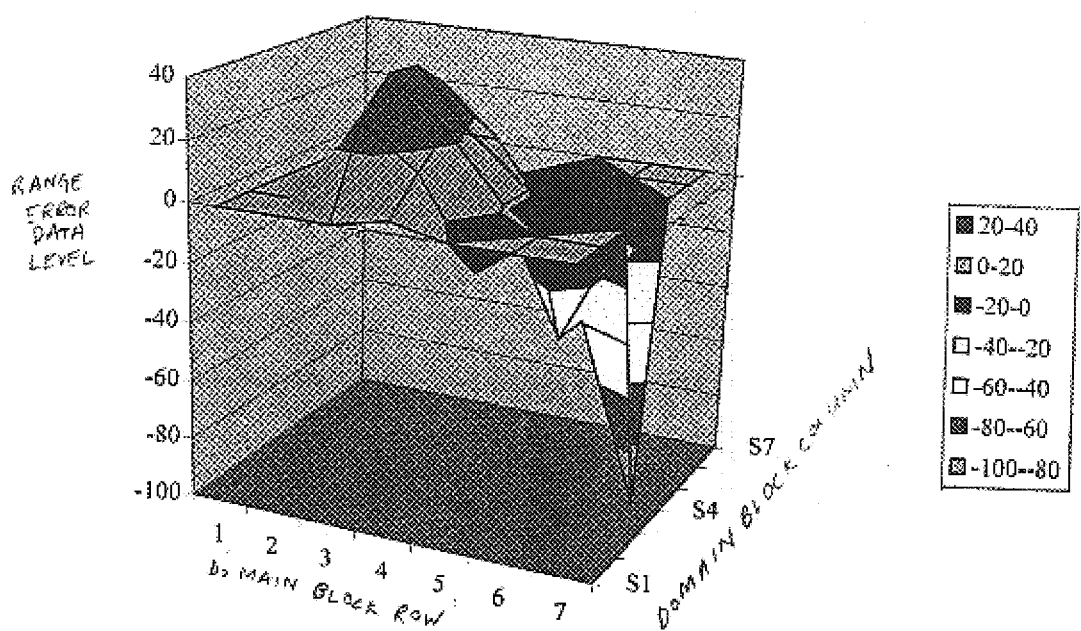
FIG. 15 is a graphical view of range error descriptor data levels over an image.

FIG. 15 shows a graphical view of the range error data for a particular image. The range error data ranges in level from −100 to 40 over this particular image with seven domain block rows and seven domain block columns.

6. Searching Database of Target Images With Source Image a. L1 Metric

The error descriptor data for the source image is compared to error descriptor data for one or more target images to determine whether the target image is similar to the source image. To compare the error descriptor data of the source and target images, two basic metrics are used. The first metric, referred to as the 'L1 metric', is computed as follows. Assuming s is the error descriptor data vector of the source image and t is the error descriptor data vector of the target image and the error descriptor data for both vectors sum to one, then the L1 distance is the sum of absolute values of the coordinate-wise differences of the vectors:

$$\text{dist}(s,t) = \Sigma |s(i) - t(i)|. \quad (1)$$

If the error descriptor data for the two error descriptor data vectors s and t total to greater than one, the error descriptor data should be normalized by the following equation:

$$\text{dist}(s,t) = \Sigma |s(i)/ts - t(i)/tt| \quad (2)$$

in which ts is the sum of the target error descriptor data vector and tt is the sum of the target error descriptor data vector.

b. L2 Metric

The L2 metric is basically a mean square error computed as follows:

$$\text{dist}(s,t) = \text{square root } ((1/25)) * \Sigma |s(i)/ts - t(i)/ts|^2 \quad (3)$$

where the sum can be from 1 to 25.

a. Scores

The scoring method used to compare source and target images are listed below for each type of error descriptor data:

TABLE 1

SCORES BY ERROR DESCRIPTOR DATA TYPE

| Descriptor | Score Formula |
|---|---|
| Collage error descriptor data | minimum of CE(target)/CE(image) or CE(image)/CE(target) |
| Address histogram error descriptor data | 1−0.5*(L1 metric) |
| Flatness error descriptor data | 1−0.5*(L1 metric) |
| Soft decision error descriptor data | 1−0.5*(L1 metric) |
| Collage error distribution descriptor data | 1−0.5*(L1 metric) |
| Range error descriptor data | 1−0.5*(L2 metric) |

The L1 and L2 metrics range between 0 and 2 so that the resulting score is normalized between 0 and 1.

Table 2 indicates preferred error descriptor data, thresholds, and weights for use in searching a database of target images for those similar to a source image.

TABLE 2

ERROR DESCRIPTOR DATA SCORE THRESHOLDS AND WEIGHTS

| Descriptor | Threshold | Weight |
|---|---|---|
| CE4 | 0.70 | 0 |
| CE8 | 0.70 | 0 |
| F4 | 0.90 | 0 |
| AD4 | 0 | 27% |
| AD8 | 0 | 27% |
| RE32 | 0.90 | 36% |
| Color | see below | 10% |

CE4 refers to collage error descriptor data performed using 4×4 domain blocks, CE8 refers to collage error descriptor data using 8×8 domain blocks, F4 refers to flatness error descriptor data computed using 4×4 domain blocks, AD4 refers to address histogram error descriptor data for 4×4 domain blocks, AD8 refers to address histogram error descriptor data for 8×8 domain blocks, RE32 refers to range error descriptor data using 32×32 domain blocks, and the Color descriptor is set forth below.

TABLE 3

COLOR DESCRIPTOR

| Descriptor | Threshold | Weight |
|---|---|---|
| Hue16 | 0 | 3.5% |
| Sat8 | 0 | 3% |
| Lum16 | 0.30 | 3.5% | where Hue16 is the Hue distribution with 16 bins of the same width, Sat8 is the Saturation distribution with 8 bins of the same width, and Lum16 is the Luminance distribution with 16 bins of the same width. Hue, Saturation, and Luminance can be derived from the standard Red, Green, and Blue pixel values in a variety of ways. For example, first define intermediate quantities Y, Cr and Cb by $$Y(77/256) * \text{Red} + (150/256) * \text{Green} + (29/256) * \text{Blue}$$

$$Cr = (\text{Red} - Y) + 128;$$

$$Cb = (\text{Blue} - Y) + 128. \quad (4)$$

Then, $$\text{Lum} = Y/256;$$

$$\text{Sat} = \text{square-root}(((Cr-128)2 + (Cb-128)^2)/128;$$

$$\text{Hue} = \text{Arcsin}(((Cr-128)/128)/\text{Sat}). \quad (5)$$

The threshold levels for the CE4, CE8, F4, RE32, and Lum16 descriptors are in effect culling devices that can be used to rapidly eliminate target images that are not relatively close to the source image. After culling, the weighting of the AD4, AD8, RE32, and Color descriptor data can be used to score remaining target images as to their relative closeness to the source image. The method of FIGS. 16A–16C uses the above-described error descriptor data and techniques to cull and score error descriptor data for target images using the error descriptor data of a source image.

Figure 16A:
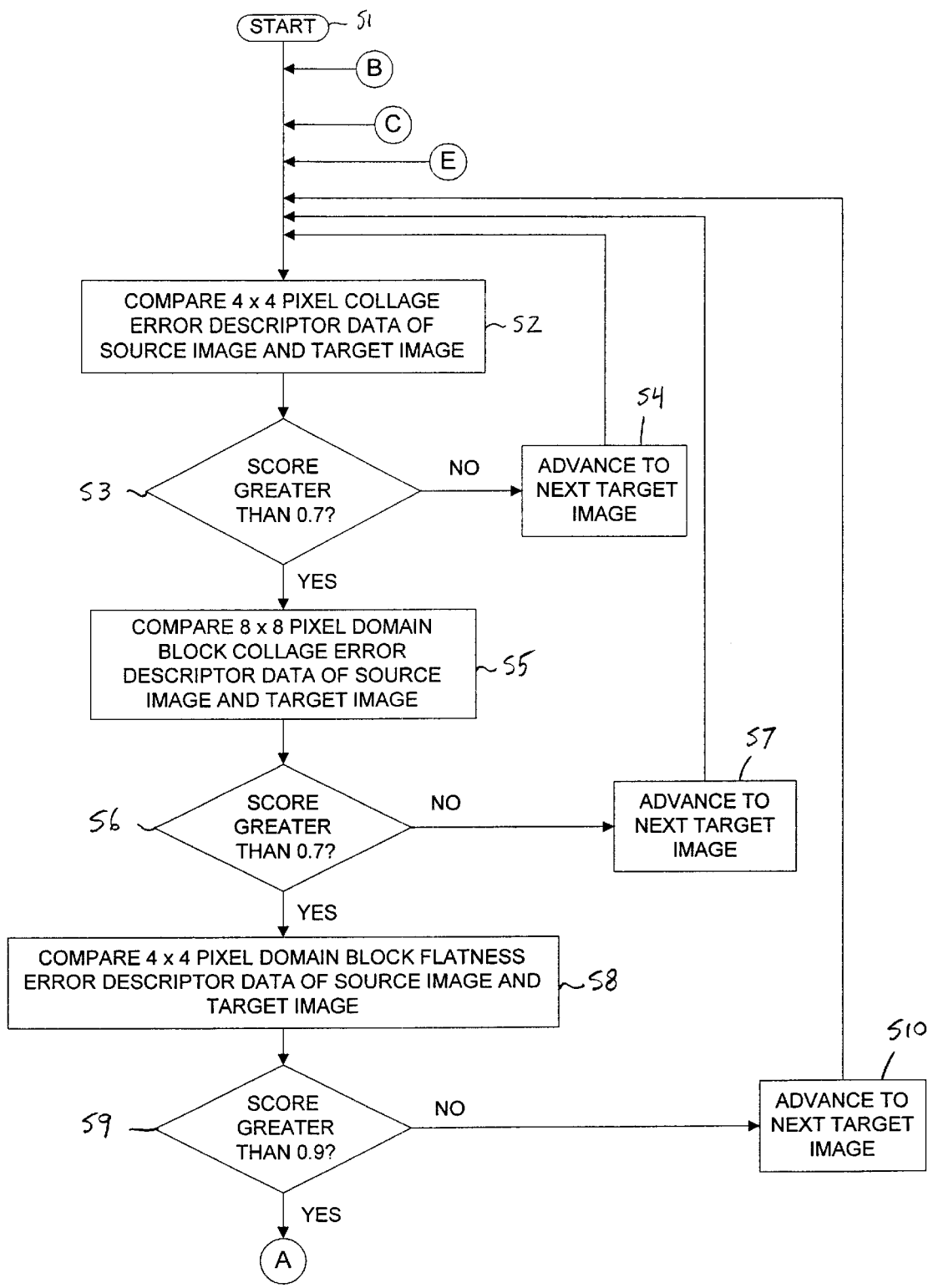
FIGS. 16A–16C are flowcharts of a method for culling and scoring target images to determine their relative closeness to a source image.
Figure 16B:
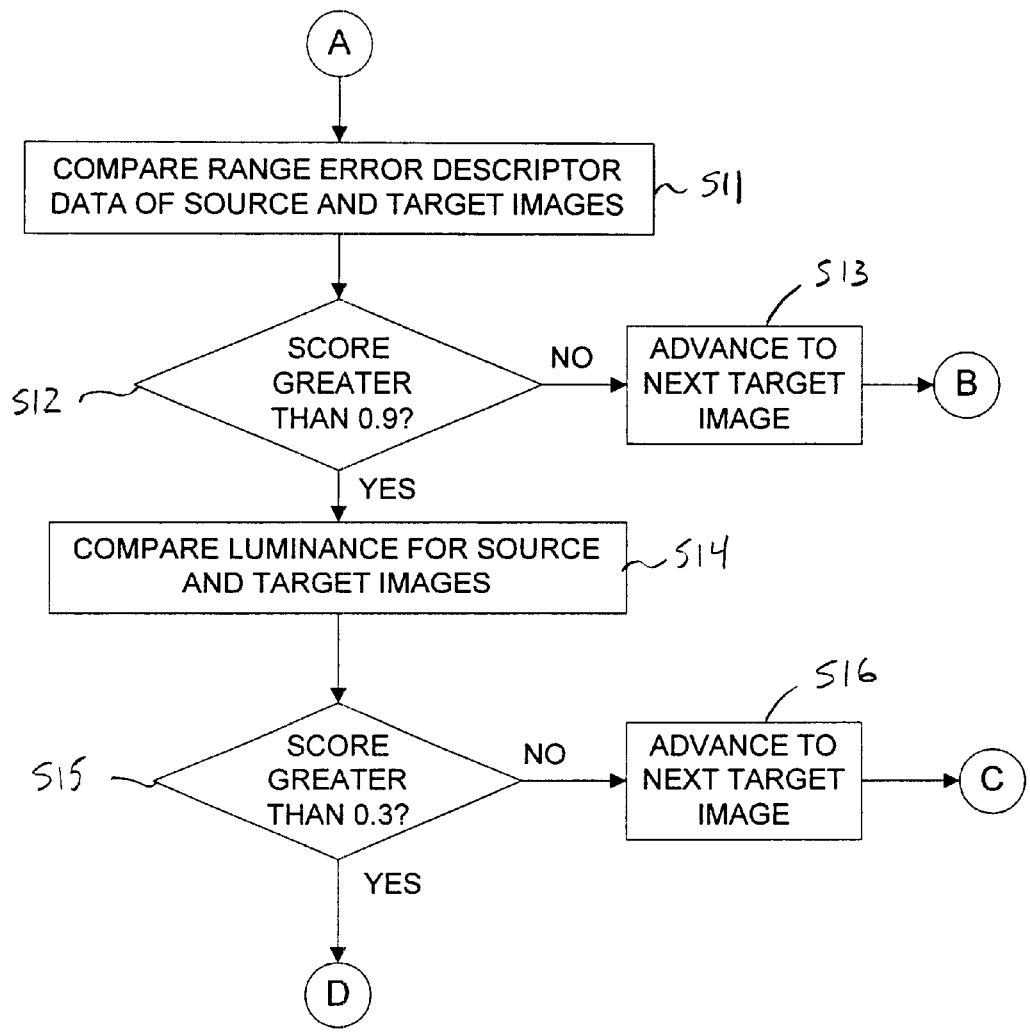
Figure 16C:
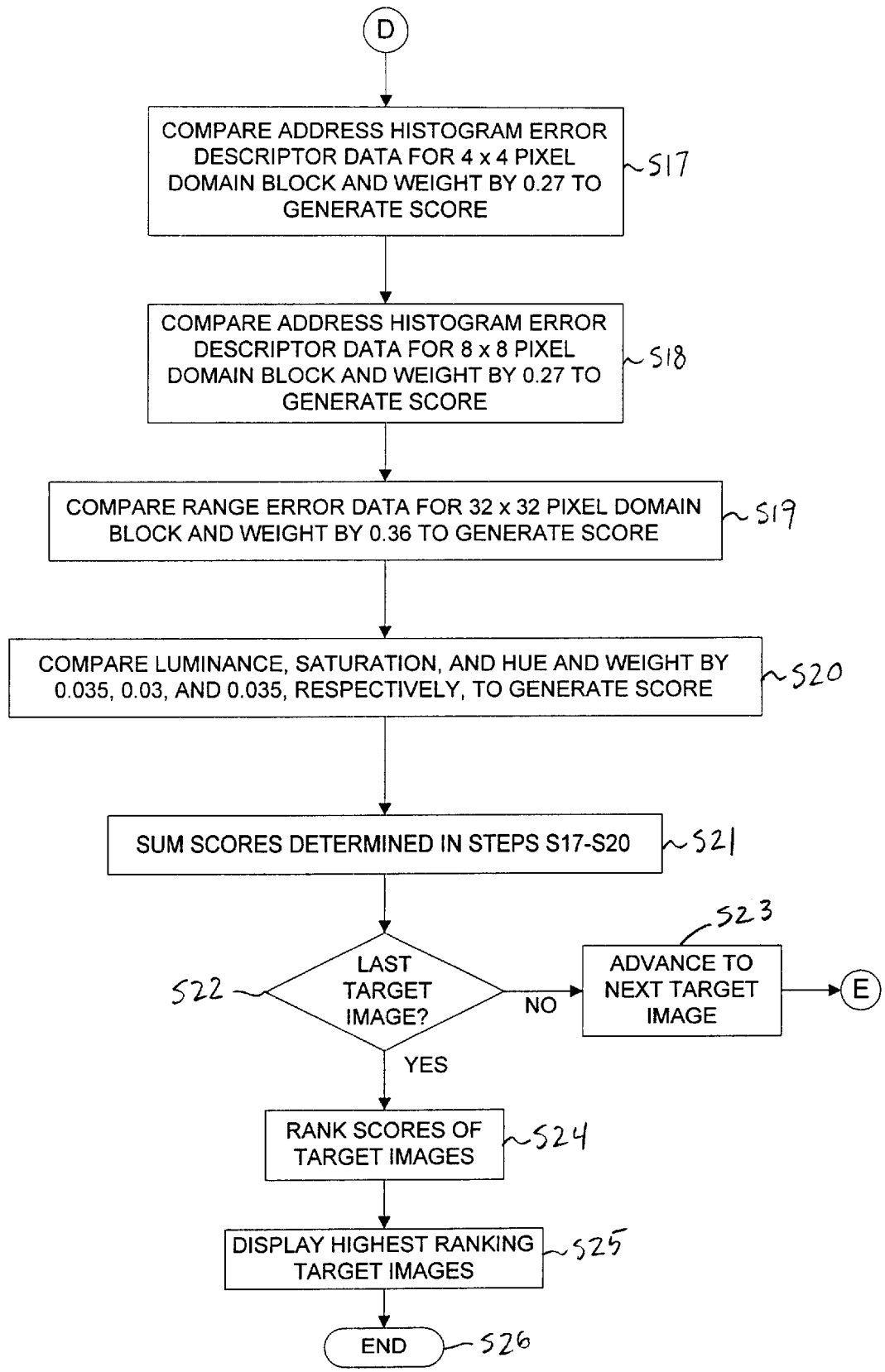

In FIGS. 16A, 16B, and 16C a method for using error descriptor data of a source image to search error descriptor data for target images stored in a database begins in step S1 of FIG. 16A. In step S2, collage error descriptor data of the source and target images prepared by the processor 11 using 4×4 pixel domain blocks, are compared by the processor to compute a score as described above for the collage error descriptor. In step S3, the processor 11 determines whether the score computed in step S2 is greater than 0.7. If not, in step S4, the processor 11 retrieves the error descriptor data for the next target image from the external memory device 16, and repeats step S2. On the other hand, if the determination in step S3 is affirmative, in step S5, the processor compares the collage error descriptor data for the source and target images using 8×8 domain blocks to generate a score. In step S6, the processor 11 determines whether the score is greater than the threshold level of 0.7. If not, in step S7, the processor 11 retrieves error descriptor data for the next target image from the external memory device 16 and repeats step S2 and subsequent steps. On the other hand, if the determination in step S6 is affirmative, in step S8, the processor 11 compares flatness error descriptor data of source and target images to determine a score. In step S9, the processor 11 determines whether the score computed in step S8 is greater than the threshold level of 0.9. If not, in step S10, the processor 11 retrieves the error descriptor data for the next target image from the external memory device 16, and repeats step S2 and subsequent steps. On the other hand, if the determination in step S9 is affirmative, in step S11 of FIG. 16B, the processor 11 compares the range error descriptor data of source and target images to generate a score. In step S12, the processor 11 determines whether the score computed in step S11 is greater than 0.9. If not, in step S13, the processor 11 retrieves the error descriptor data for the next target image from the external memory device 16, and the processor 11 repeats step S2 and subsequent steps. On the other hand, if the determination in step S12 is affirmative, in step S14, the processor 11 compares luminances for the source and target images to compute a score. In step S15, the processor 11 determines whether the score computed in step S14 is greater than 0.3. If not, in step S16, the processor 11 retrieves the error descriptor data for the next target image from the external memory device 16 and repeats step S2 and subsequent steps. On the other hand, if the determination in step S15 is affirmative, in step S17 of FIG. 16C, the processor 11 compares the address histogram error descriptor data of the source and target images using 4×4 domain blocks to generate a score that is weighted by 0.27. In step S18, the processor 11 compares the address histogram error descriptor data for 8×8 pixel domain blocks to generate a score that is weighted by 0.27. In step S19, the processor 11 compares the range error data for 32×32 pixel domain blocks to compute a score that is weighted by 0.36. In step S20, the processor 11 computes luminance, saturation, and hue for the source and target images, subtracts corresponding luminance, saturation, and hue levels for the source and target images, and multiplies this data by weights of 0.035, 0.03, and 0.035, respectively. In step S21, the processor 11 sums the weighted scores generated in steps S17–S20, and in step S22, the processor 11 determines whether error descriptor data for the last target image in the database has been either culled or scored. If not, in step S23 the processor 11 retrieves the error descriptor data for the next target image from the external memory device 16 and the processor repeats step S2 and subsequent steps. On the other hand, if the determination in step S22 is affirmative, in step S24 the processor 11 ranks the scores of the target images. In step S25 the processor 11 displays the highest ranking target images by using target image identity data associated with the target error descriptor data in the external memory device 16 to retrieve the image data from the memory device and to supply the image data to the display 13 to generate a visual display of the target image(s). In step S26, the method of FIGS. 16A–16C ends.

Specific implementations of control programs that can be run by processor 11 to calculate collage error descriptor data, address histogram error descriptor data, flatness error descriptor data, soft decision error descriptor data, collage error distribution descriptor data, and range error distribution descriptor data, are indicated in FIGS. 17–22, respectively. Such control programs can be stored in the RAM 15. The processor 11 executes such control programs to generate corresponding error descriptor data.

The many features and advantages of the present invention are apparent from the detailed specification and thus it is intended by the appended claims to cover all such features and advantages of the described apparatus and methods which follow in the true scope and spirit of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

What is claimed is:

1. A method comprising the steps of:
   culling a target error descriptor data for target images stored in a database based on error descriptor data for a source image and at least one predetermined threshold level to produce culled target error descriptor data; and
   scoring the culled target error descriptor data; and
   ranking the target error descriptor data by score to indicate the relative closeness of the target images to the source image.

2. The method of claim 1, wherein said step of culling is performed using collage error descriptor data computed with 4×4 pixel domain blocks.

3. The method of claim 1, wherein said step of culling is performed using collage error descriptor data computed with 8×8 pixel domain blocks.

4. The method of claim 1, wherein said step of culling is performed using flatness error descriptor data computed using 4×4 pixel domain blocks.

5. The method of claim 1, wherein said step of culling is performed using range error descriptor data.

6. The method of claim 1, wherein said step of culling is performed using luminance data.

7. The method of claim 1, wherein said step of scoring is performed using address histogram error descriptor data for a 4×4 pixel domain block weighted by 0.27.

8. The method of claim 1, wherein said step of scoring is performed using address histogram error descriptor data for an 8×8 pixel domain block weighted by 0.27.

9. The method of claim 1, wherein said step of scoring is performed using range error data for a 32×32 pixel domain block weighted by 0.36.

10. The method of claim 1, wherein said step of scoring is performed using luminance, saturation, and hue data weighted by 0.035, 0.03, and 0.035, respectively.

11. The method of claim 1, wherein said step of ranking is performed by sorting scores of error descriptor data generated from the source and target images to rank the error descriptor data for the target images by relative closeness to the error descriptor data of the source image.

12. A method of generating collage error descriptor data for an image based on domain blocks and range blocks of the image, comprising the steps of:

(a) initializing the collage error descriptor data of the image to zero;
(b) for each respective domain block of the image:
(i) determining which of a plurality of range blocks is most similar thereto;
(ii) calculating a smallest summed error data as a function of the pixel data of the domain block and most similar range block;
(c) adding the smallest summed error data for all respective domain blocks of the image to define the collage error descriptor data of the image.

13. The method of claim 12 wherein the plurality of range blocks are within a predetermined search pattern, wherein each domain block and range block has pixel data and a size, and wherein step (b) further comprises:
(i) for each respective range block within the predetermined pattern:
scaling the range block to the size of the respective domain block;
mean-adjusting the scaled range block pixel data and the domain block pixel data;
subtracting the mean-adjusted, scaled range block pixel data from the mean-adjusted domain block pixel data; and
summing the absolute value of the differences between the range block pixel data and the domain block pixel data to generate summed error data;
(ii) from all range blocks within the predetermined search pattern, determining the range block yielding the smallest summed error data.

14. A method of generating collage error descriptor data for an image based on domain block data and range block data, comprising the steps of:
(a) initializing the collage error descriptor data to zero;
(b) for each respective domain block of the image:
(i) scaling range block data for a predetermined search pattern to pixel size of the respective domain block data;
(ii) mean-adjusting the scaled range block data and domain block data;
(iii) subtracting the mean-adjusted, scaled range block data from the mean-adjusted domain block data;
(iv) summing the absolute value of the differences between the pixels of the range block data and the domain block data to generate summed error data for all range blocks of the search pattern; and
(v) determining the range block yielding the smallest summed error data;
(c) adding the smallest summed error data for all of the domain blocks of the image to produce the collage error descriptor data.

15. A method of generating address histogram error descriptor data for an image based on domain block data and range block data, comprising the steps of:
(a) initializing address bins for predetermined ranges of summed error data levels to zero;
(b) for each respective domain block of the image:
(i) scaling range block data for a predetermined search pattern to pixel size of the respective domain block data;
(ii) mean-adjusting the scaled range block data and domain block data;
(iii) subtracting the mean-adjusted, scaled range block data from the mean-adjusted domain block data to produce difference data;
(iv) summing the absolute value of the difference data between the pixels of the range block data and the domain block data to generate summed error data for all range blocks of the search pattern;
(v) determining the range block yielding the smallest summed error data;
(vi) incrementing the address bin having a level corresponding to the smallest summed error data;
(c) dividing address bin levels by the number of domain blocks in the image to produce address histogram error descriptor data.

16. A method of generating flatness error descriptor data for an image based on domain block data and range block data, comprising the steps of:
(a) initializing an accumulated flatness error descriptor data to zero;
(b) for each respective domain block of the image:
(i) scaling range block data for a predetermined search pattern to pixel size of the respective domain block data;
(ii) mean-adjusting the scaled range block data and domain block data;
(iii) subtracting the mean-adjusted, scaled range block data from the mean-adjusted domain block data to generate difference data;
(iv) summing the absolute value of the difference data between the pixels of the range block data and the domain block data to generate summed error data for all range blocks of the search pattern; and
(v) if the summed error data is less than a predetermined flatness threshold data for all range blocks of the search pattern, then incrementing the accumulated flatness error descriptor data;
(c) defining the flatness error descriptor data for the image as the accumulated flatness error data.

17. A method of generating soft decision error descriptor data for an image based on domain block data and range block data, comprising the steps of:
(a) initializing soft decision error descriptor data to zero and initializing numerator and denominator data for all range blocks to zero;
(b) for each respective domain block of the image:
(i) scaling range block data for a predetermined search pattern to pixel size of the respective domain block data;
(ii) mean-adjusting the scaled range block data and domain block data;
(iii) subtracting the mean-adjusted, scaled range block data from the mean-adjusted domain block data to generate difference data;
(iv) summing the absolute value of the difference data between the pixels of the range block data and the domain block data to generate summed error data for each respective range block of the search pattern; and
(v) if the summed error data is not less than a predetermined flatness threshold data for all range blocks of the search pattern, then:
for each range block having summed error data equal to zero, setting the numerator for the respective range block to one and incrementing the denominator for the respective range block by one;
for each range block having summed error data less than a relevance threshold, setting the numerator for the respective range block to one divided by the square of the summed error data and incrementing the denominator for the respective range block by the numerator; and for each respective range block of the search pattern, dividing its numerator by its denominator to generate soft decision data for the respective domain block;

(c) normalizing the soft decision data for all of the domain blocks of the image; and (d) defining the soft decision error descriptor data for the image as the normalized soft decision data for all of the domain blocks of the image.

18. A method of generating collage error distribution descriptor data for an image based on domain block data and range block data, comprising the steps of:

(a) initializing collage error distribution bin values to zero;

(b) for each respective domain block of the image:
  (i) scaling range block data for a predetermined search pattern to pixel size of the respective domain block data;
  (ii) generating summed error data for all range blocks of the search pattern;
  (iii) determining the range block yielding the smallest summed error data;
  (iv) incrementing the collage error distribution bin value as a function of the smallest summed error data of the domain block;

(c) setting the collage error distribution bin value as the collage error distribution descriptor data for the image.

19. A method of generating range error descriptor data for an image based on domain block data and range block data, comprising the steps of:

(a) initializing the range error descriptor data to zero;

(b) for each respective domain block of the image:
  (i) scaling range block data for a predetermined search pattern to pixel size of the respective domain block data;
  (ii) generating summed error data for each range block of the search pattern; and
  (iii) determine mean error data from the summed error data;

(c) subtracting mean error data from summed error data for each range block to produce difference data;

(d) dividing the difference data by the number of pixels contributing to the mean error data in the range blocks and the number of pixels in the domain block, to determine range error data for each range block of the domain block; and (e) setting the range error data for all domain blocks as the range error descriptor data for the image.

* * * * *